US006536616B2

United States Patent
Sandor et al.

(10) Patent No.: US 6,536,616 B2
(45) Date of Patent: *Mar. 25, 2003

(54) CONTAINER NECK FINISH AND METHOD AND APPARATUS FOR FORMING SAME AND CAP FOR USE THEREON

(75) Inventors: Laszlo G. Sandor, Fremont, CA (US); Daniel Luch, Morgan Hill, CA (US); Richard E. Repp, San Jose, CA (US)

(73) Assignee: Portola Packaging, Inc., San Jose, CA (US)

(*) Notice: Subject to any disclaimer, the term of this patent is extended or adjusted under 35 U.S.C. 154(b) by 33 days.

This patent is subject to a terminal disclaimer.

(21) Appl. No.: 09/844,103

(22) Filed: Apr. 27, 2001

(65) Prior Publication Data

US 2002/0043512 A1 Apr. 18, 2002

Related U.S. Application Data

(63) Continuation-in-part of application No. 09/412,035, filed on Oct. 4, 1999, now abandoned, and a continuation-in-part of application No. 09/365,432, filed on Aug. 2, 1999, now Pat. No. 6,241,111, said application No. 09/412,035, is a continuation-in-part of application No. 08/894,189, filed on Jul. 29, 1997, now Pat. No. 6,003,699, and a continuation-in-part of application No. 08/847,928, filed on Apr. 28, 1997, now Pat. No. 5,964,362, said application No. 09/365,432, is a continuation-in-part of application No. 08/894,189, filed as application No. PCT/US96/00639 on Jan. 16, 1996, and a continuation-in-part of application No. 08/847,928, which is a continuation-in-part of application No. 08/385,808, filed on Feb. 9, 1995, now abandoned, said application No. PCT/US96/00639, is a continuation-in-part of application No. 08/385,808.

(51) Int. Cl.⁷ .................... B65D 41/48; B29C 49/50; B29C 25/00
(52) U.S. Cl. .................... 215/43; 215/45; 215/256; 215/344; 264/536; 425/527

(58) Field of Search .................... 215/43–45, 256, 215/252, 343, 344, 354; 206/508, 309; 425/525, 527, 289, 292, 296, 298, 308, 310; 264/533, 536, 531, 163

(56) References Cited

U.S. PATENT DOCUMENTS

| 700,653 A | 5/1902 | Jobson |
| 3,343,698 A | 9/1967 | Anderson et al. |

(List continued on next page.)

FOREIGN PATENT DOCUMENTS

| DE | 2205150 B2 | 8/1972 |
| GB | 2103990 A | 3/1983 |

*Primary Examiner*—Nathan J. Newhouse
(74) *Attorney, Agent, or Firm*—Dorsey & Whitney LLP

(57) ABSTRACT

The neck of a container has a smooth seal surface engaged by the inner skirt or plug of a cap. Such surface is free of trim and parting line flaws which are characteristic of blow-molded jars because the surface is formed in such a way that the seal surface is not in contact with mold parting lines and further the trim (excess plastic) of the neck is located away from the sealing surface. In one form of the disclosure, above the sealing surface the neck wall slants outward and then bends upward-inward in a short, tapered stretch about 18 degree to the horizontal which engages the underside of the cap disk to compress against the disk or a liner or foil. Other forms of seal surfaces are disclosed In another form of the invention, above the seal surface the neck extends outward and then upward and then inward in a flange which is trimmed along a line which has a circumference no less than the circumference of the seal surface. The exterior of the neck is formed with shoulders or screw threads which engage over locking beads or threads on the interior of the outer skirt of the cap. Caps suitable for combination with the neck, methods of forming the neck and mold apparatus for forming the neck are also disclosed.

17 Claims, 16 Drawing Sheets

U.S. PATENT DOCUMENTS

| | | |
|---|---|---|
| 3,572,413 A | 3/1971 | Livingstone |
| 3,592,349 A | 7/1971 | Baugh |
| 3,784,038 A | 1/1974 | Uhlig |
| 3,899,279 A | 8/1975 | Hudson et al. |
| 3,940,004 A | 2/1976 | Faulstich |
| 4,037,748 A | 7/1977 | Stubb, Jr. |
| 4,066,182 A | 1/1978 | Allen et al. |
| 4,187,070 A | 2/1980 | Martin, Jr. |
| 4,202,455 A | 5/1980 | Faulstich |
| 4,225,303 A | 9/1980 | Crisci |
| 4,296,871 A | 10/1981 | Andersson |
| 4,298,129 A | 11/1981 | Stull |
| 4,305,517 A | 12/1981 | Dennis |
| 4,354,609 A | 10/1982 | Hidding |
| 4,384,654 A | 5/1983 | Hospes |
| 4,402,451 A | 9/1983 | Woerz et al. |
| 4,496,066 A | 1/1985 | Bullock, III |
| 4,625,876 A | 12/1986 | Bullock, III |
| 4,691,834 A | 9/1987 | Bullock, III |
| 4,699,285 A | 10/1987 | Perne et al. |
| 4,699,286 A | 10/1987 | Nolan |
| 4,699,287 A | 10/1987 | Bullock |
| 4,732,289 A | 3/1988 | Granat et al. |
| 4,798,301 A | 1/1989 | Bullock et al. |
| 4,823,967 A | 4/1989 | Thompson |
| 4,828,128 A | 5/1989 | Tackles |
| 4,844,268 A | 7/1989 | Bullock, III |
| 4,903,849 A | 2/1990 | Wallman |
| 4,934,546 A | 6/1990 | Markley |
| 5,036,991 A | 8/1991 | Wallman |
| 5,213,224 A | 5/1993 | Luch |
| 5,256,055 A | 10/1993 | Morris |
| 5,308,574 A | 5/1994 | Yamazaki et al. |
| 5,373,955 A | 12/1994 | Marino |
| 5,383,558 A | 1/1995 | Wilkinson et al. |
| 5,456,376 A | 10/1995 | Luch et al. |
| 5,593,055 A | 1/1997 | Repp et al. |
| 5,964,362 A | 10/1999 | Sandor et al. |
| 5,967,352 A | 10/1999 | Repp et al. |
| 5,975,320 A | 11/1999 | Bietzer et al. |
| 5,975,321 A | 11/1999 | Luch |
| 6,003,699 A | 12/1999 | Sandor et al. |

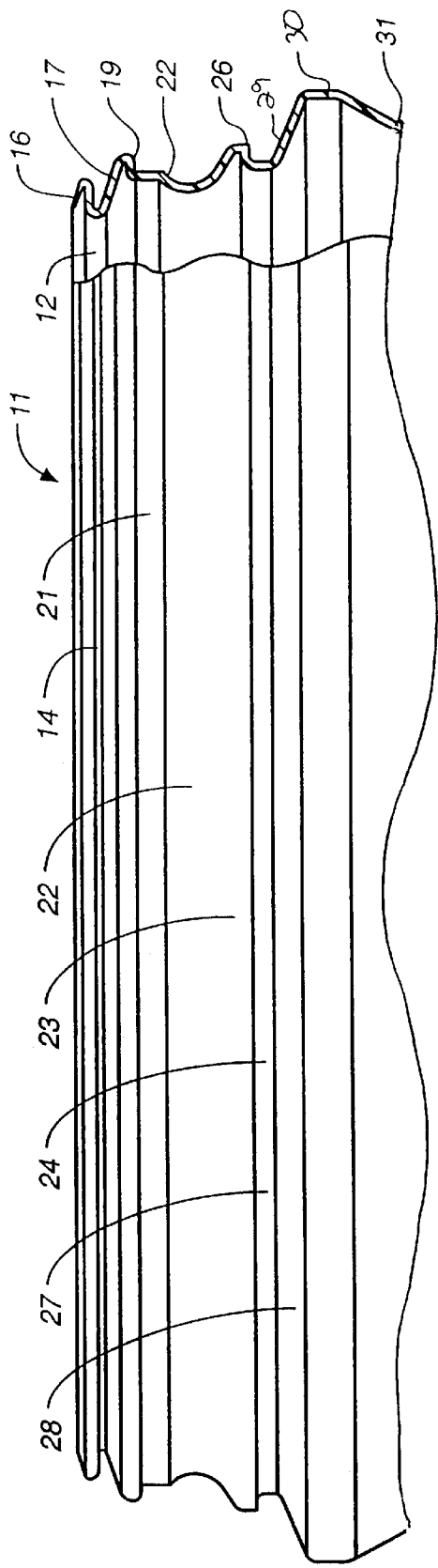
FIG._1
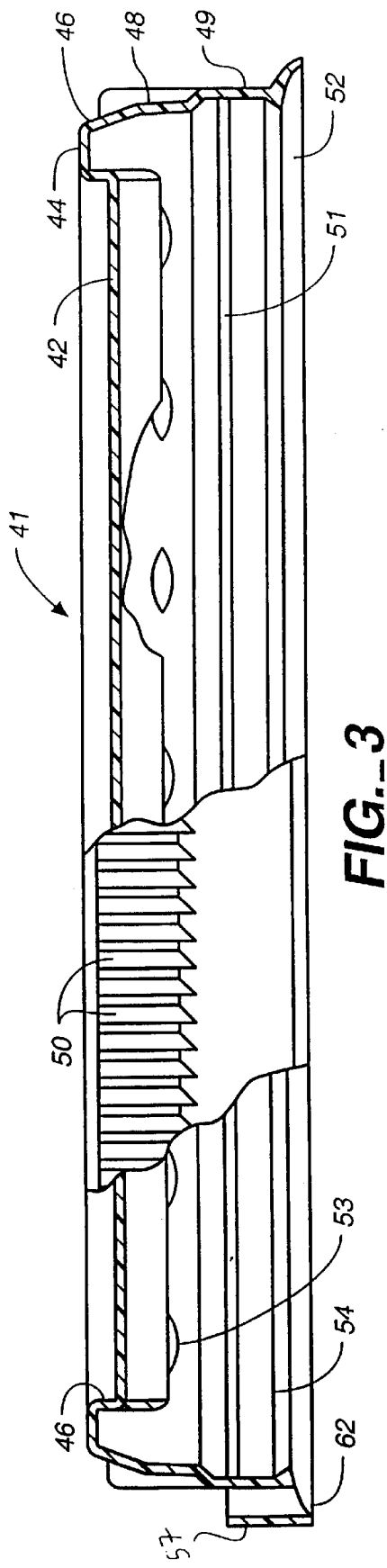
FIG._3

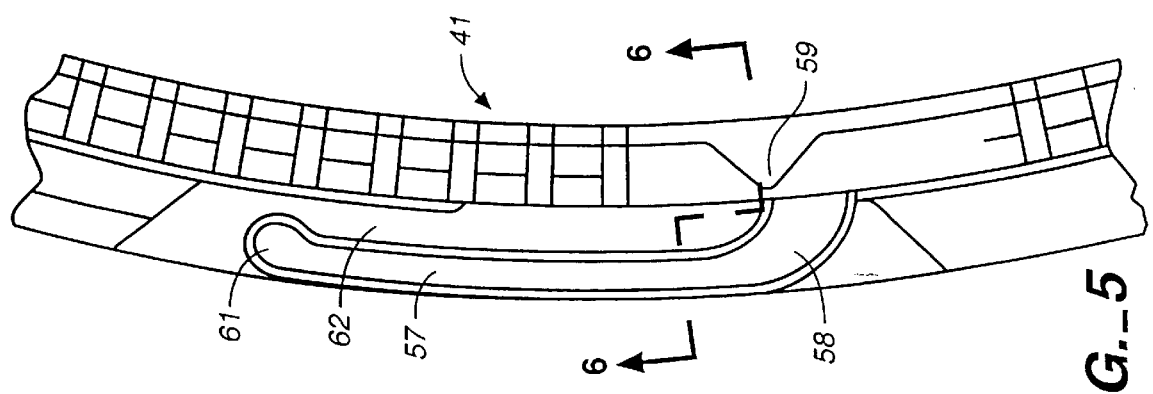
FIG._5
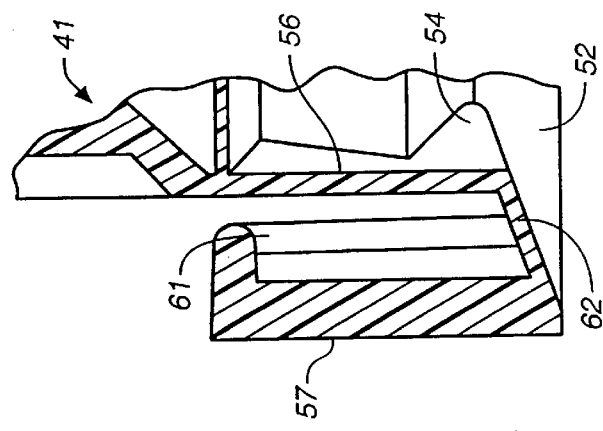
FIG._6
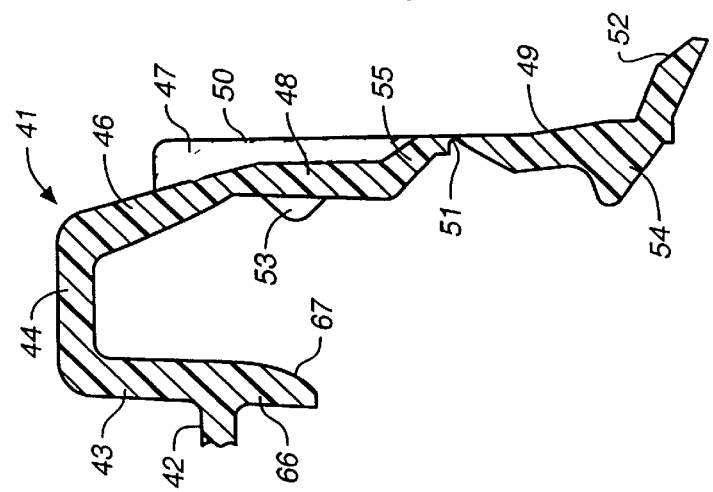
FIG._4
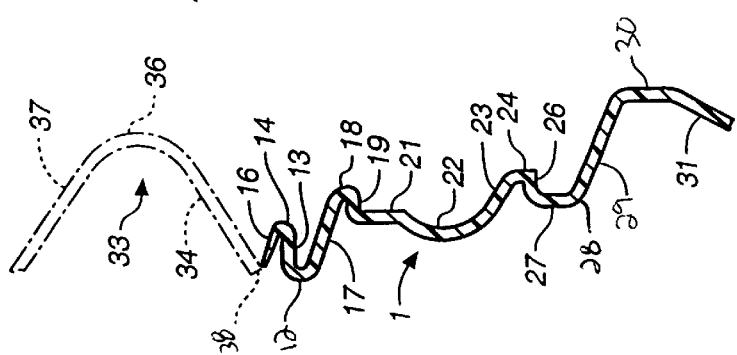
FIG._2

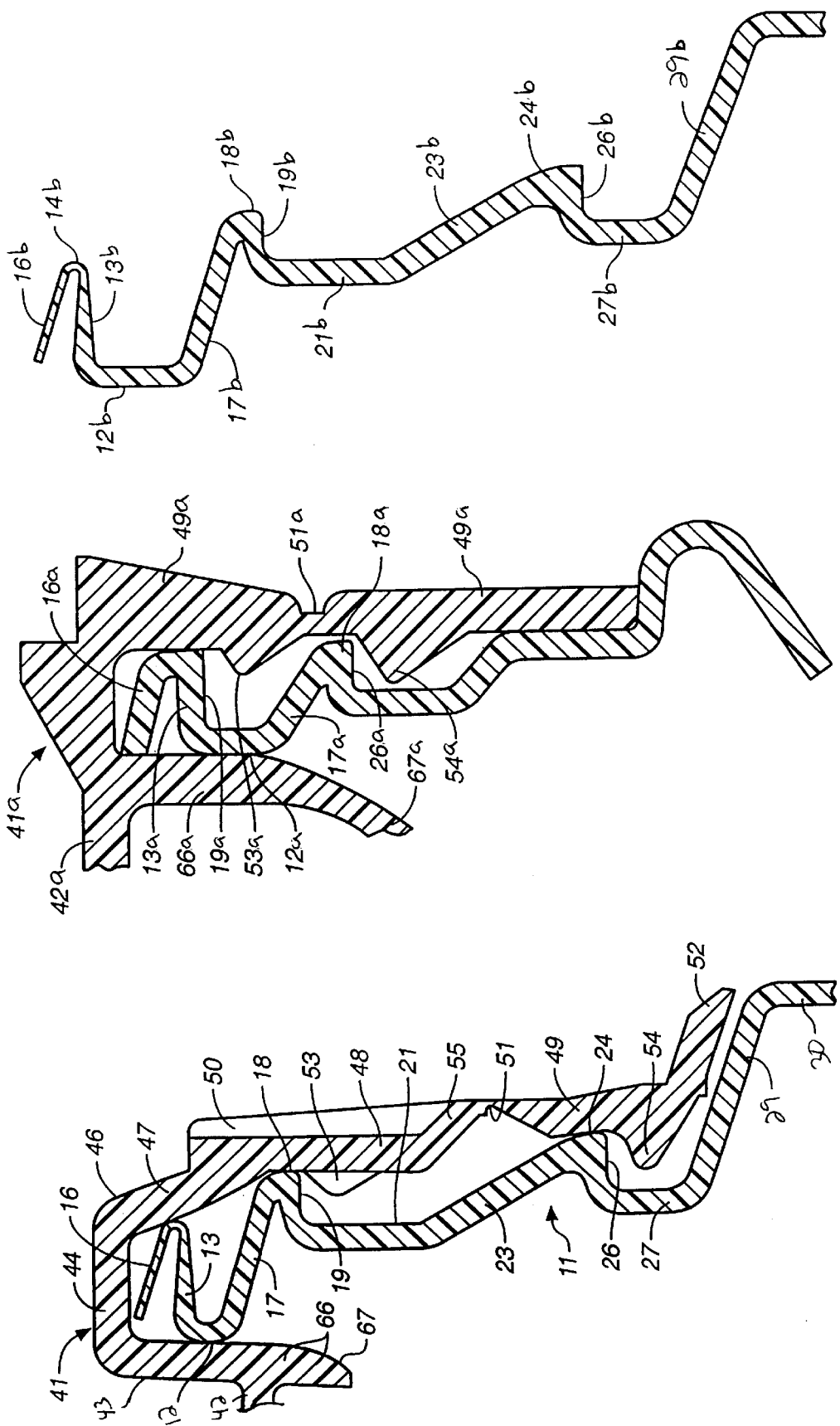
FIG._9
FIG._8 (PRIOR ART)
FIG._7

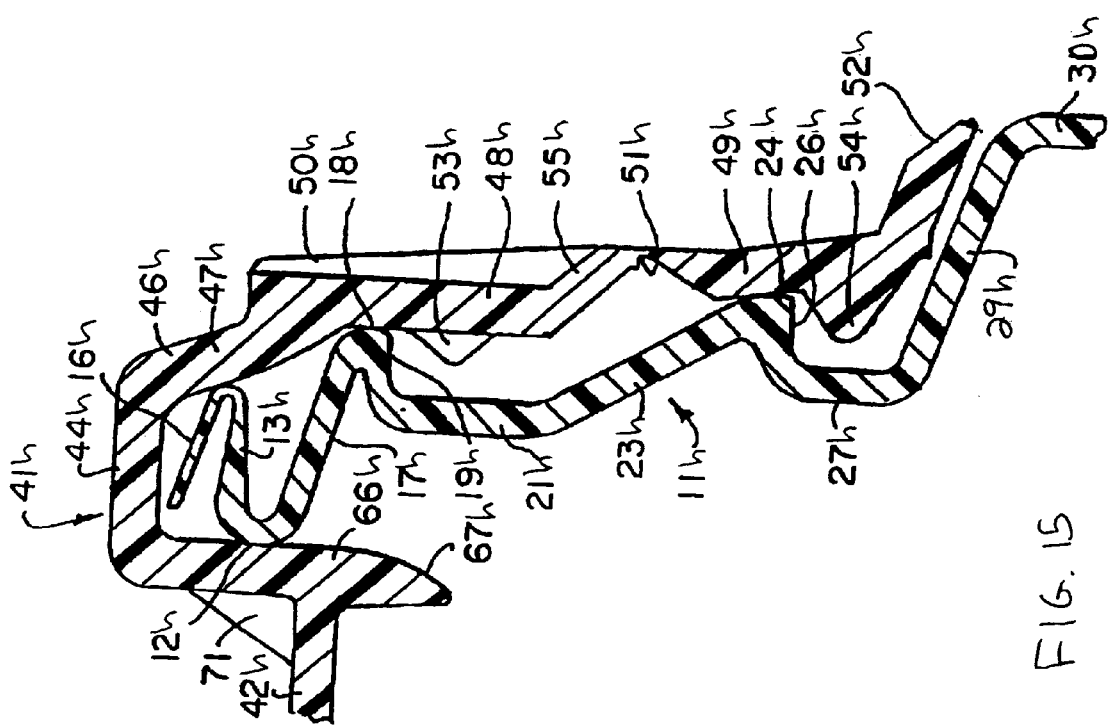

CONTAINER NECK FINISH AND METHOD AND APPARATUS FOR FORMING SAME AND CAP FOR USE THEREON

RELATED APPLICATIONS

This application is a Continuation-in-Part of U.S. patent application Ser. No. 09/412,035, filed Oct. 4, 1999 and now abandoned, and a Continuation-in-Part of U.S. patent application Ser. No. 09/365,432, filed Aug. 2, 1999 and now U.S. Pat. No. 6,241,111.

Said U.S. patent application Ser. No. 09/412,035 is a Continuation-in-Part of U.S. patent application Ser. No. 08/894,189, filed Jul. 29, 1997 and now U.S. Pat. No. 6,003,699, and a Continuation-in-Part of U.S. patent application Ser. No. 08/847,928, filed Apr. 28, 1997 and now U.S. Pat. No. 5,964,362.

Said U.S. patent application Ser. No. 09/365,432 is a Continuation-in-Part of said U.S. patent application Ser. No. 08/894,189, and a Continuation-in-Part of said U.S. patent application Ser. No. 08/847,928. Said U.S. patent application Ser. No. 08/894,189 is a National Stage of International Application No. PCT/US96/00639, filed Jan. 16, 1996 and now International Publication No. WO96/24526.

Said U.S. patent application Ser. No. 08/847,928 is a Continuation-in-Part of U.S. patent application Ser. No. 08/385,808, filed Feb. 9, 1995 and now abandoned.

Said International Application No. PCT/US96/00639 is a Continuation-in-Part of said U.S. patent application Ser. No. 08/385,808.

BACKGROUND OF THE INVENTION

Field of the Invention

The invention relates to a new and improved blow molded neck construction for a bottle or other container, a cap therefor, a method of forming the neck, and molds for forming the neck. More particularly, the present invention relates to a neck finish for a blow molded plastic bottle characterized by the fact that when used with a cap having a plug, for example, an inner skirt, the surface of the neck against which the plug seals is a seal surface without parting lines or parting line defect. A portion of the neck above the seal surface includes an inward directed thin flexible flange and no portion of the neck has a diameter less than that of the seal surface. Hence, the plug seals against a smooth surface and leakage is prevented.

Description of Related Art

An exemplar of the prior art is U.S. Pat. No. 4,691,834 ("the 834 patent") which shows an upward inward directed flexible flange sealing against the corner of the intersection of the outer wall of the plug and the underside of the top of the cap. The neck sealing surface is, inherently, somewhat uneven and ragged since the neck is cut or sheared adjacent this sealing surface. In the present invention, however, the neck is trimmed on the edge above and removed from the seal surface, i.e., the trimmed edge is not the portion of the neck which seals against the cap plug. The references cited against the '834 Patent are likewise distinguishable.

U.S. Pat. Nos. 4,625,876 and 4,798,301 show curved plug contacting surfaces but these are of substantially the same diameters as the inner edge of the flanges which engage the underside of the top of the cap.

U.S. Pat. No. 4,699,286 shows a neck and cap which, in shape, resemble portions of the present invention. The seal surface, however, is between the inwardly extending upper lip of the bottle neck and the a downwardly depending annular plug portion of the cap. Such a sealing surface is, inherently, somewhat uneven and ragged because the neck, like that of the '834 patent above, is cut or sheared adjacent this seal surface.

Similarly, the '287 patent also shows a neck and cap which, in shape, resemble portions of the present invention. One seal surface, however, is between the inwardly extending upper lip of the bottle neck and a downwardly depending annular plug portion of the cap. Such a sealing surface is, as noted above, inherently uneven and ragged because the neck is cut or sheared adjacent this sealing surface.

SUMMARY OF THE INVENTION

The bottle of the present invention is blow molded in a split mold by techniques well known in the art. The surfaces of the mold which define the neck structure cause the neck shape hereinafter described. An upper portion of the parison above the neck is trimmed or cut from the neck according to conventional practice (e.g. pull-up trim, spin trim, ram-down, etc.). In one neck structure, the circle at which the upper portion of the parison is severed from the neck is the inner edge of an inward-upward slanted flange. The other end of the flange merges into a curved surface which extends inward a greater distance than the aforesaid edge to merge with an internal sealing surface of lesser diameter than said edge. The neck structure above the neck sealing surface may have rapidly changing diameters which form a flexible membrane due to parison stretching in the blow molding process. In one form of the invention, below the sealing surface the exterior of the neck structure slants downward-outward to a horizontal shoulder and then extends downwardly and then outwardly to a second or lower shoulder. Other cap engaging means may be used.

Many of the illustrated modifications of the present invention include neck finishes and caps of the "snap-on" variety. In accordance with the present invention, however, screw caps wherein the neck and cap skirt have complementary threads are also illustrated. The fact that the same upper neck structure may be used either with a snap-on or a screw-on cap thus becomes apparent.

A cap with which the neck is used has a top having a depending central plug or inner skirt. The outer surface of the plug or inner skirt seals tightly against the sealing surface of the neck. The cap can also include an outer skirt having internal sealing beads which engage the upper and lower shoulders of the neck to hold the cap in place. Such an outer skirt is not a necessary feature of the present invention because the primary sealing action takes place between the outer surface of the central plug and the sealing surface of the neck. Such a skirt, however, provides an additional tamper-evident feature. Alternatively, the neck may have threads which are engaged by threads on the cap skirt. The lower portion of the outer cap skirt may be removed by the user engaging and pulling a pull tab which causes the lower part of the skirt to disengage at a circumferential score line. Until such lower skirt is removed, the cap and neck are tamper-evident. Other types of neck engaging means may be employed.

Several different ways may be employed to form the neck finishes of the present invention in blow molding operations. One such means employs a conventional blow mold wherein a blow dome is formed above the neck finish with several abrupt bends in the parison between the blow dome and the neck sealing surface. The blow dome is trimmed from the neck in a conventional trimming operation.

In another modification of the invention, the shear steel located above the neck finish insert has a projecting extension which is engaged by an outward projection on the blow pin so that when the blow pin is withdrawn, the two extensions shear the parison above the sealing surface of the neck.

In still another form of the invention, the shear steels have inward projections, and the blow pin has an enlarged upper diameter so that as the molds come together the shear steel projection cuts the parison by shearing against the enlargement of the blow pin.

In still another form of the invention, the shear steel is formed with an outward projection and the blow pin is formed with an outward projection below the level of the shear steel. When the blow pin is raised, the two projections shear the excess parison. In this form of the invention the neck finish is approximately vertical above the sealing surface.

The accompanying drawings, which are incorporated in and form a part of this specification, illustrate embodiments of the invention and, together with the description, serve to explain the principles of the invention.

BRIEF DESCRIPTION OF THE DRAWINGS

FIG. 1 is a side elevational view of a neck portion of a container in accordance with the present invention partially broken away to reveal structure.

FIG. 2 is an enlarged sectional view of the neck structure and a portion of a blow dome superimposed thereabove.

FIG. 3 is a side elevational view of a snap-on type cap with which the neck of FIG. 1 is used, the cap being partially broken away in section to reveal internal construction.

FIG. 4 is an enlarged sectional view of a portion of the cap shown in FIG. 3.

FIG. 5 is a further enlarged fragmentary top plan view of a portion of the cap of FIG. 3 showing a top view of a pull tab.

FIG. 6 is a fragmentary sectional view of the portion of the cap of FIG. 3 taken substantially along line 6—6 of FIG. 5.

FIG. 7 is an enlarged sectional view schematically showing the seating of the cap of FIG. 3 on the neck of FIG. 1.

FIG. 8 is a view similar to FIG. 7 of a prior art device.

FIG. 9 is an enlarged view of a modified neck structure similar to that shown in FIG. 1 and showing an alternate seal area.

FIG. 15 is a view similar to FIG. 7 of another modified neck and cap.

DESCRIPTION OF THE PREFERRED EMBODIMENTS

Figure 11:
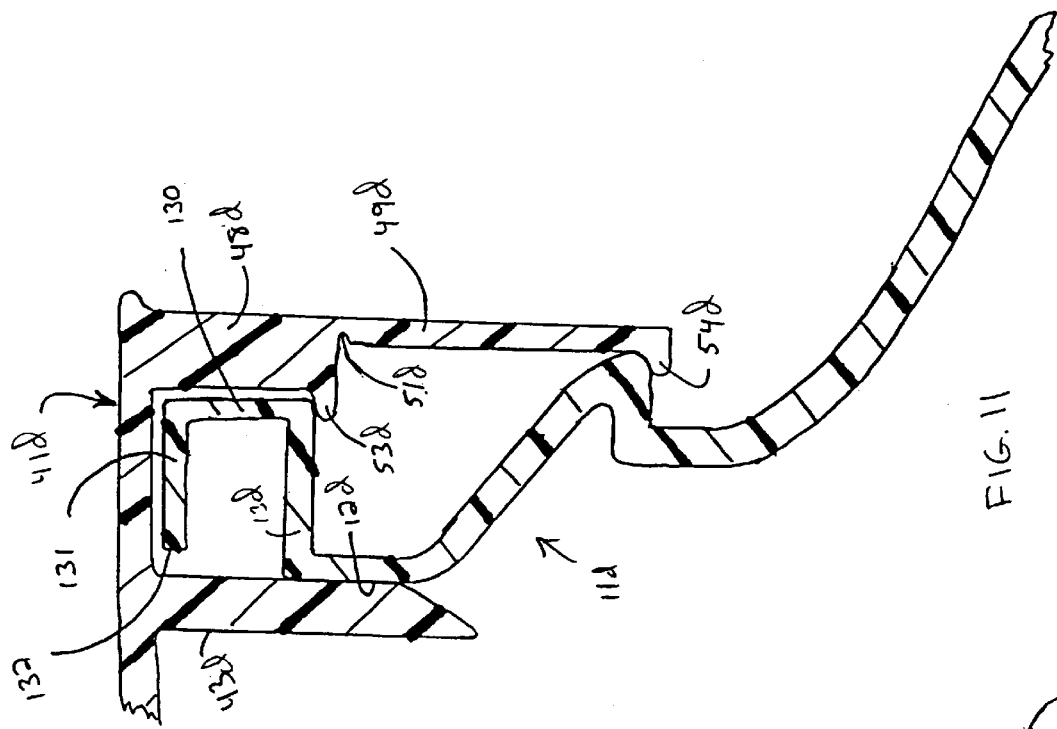
FIG. 11 is a view similar to FIG. 7 of another modified neck and cap.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As shown in FIGS. 1–7, neck 11 is formed on a thin-walled jar or other container and has a curved primary seal surface 12 which is very smooth and is distinguished by the absence of parting lines or parting line defects inasmuch as it is formed by air pressure or other mechanical means during the blow molding process. Primary seal surface 12 is not formed by the mold halves and thus does not have a mold parting line or associated parting line defects formed therein. As shown in FIG. 2, the seal surface 12 can be curved. Further, the primary sealing surface has minimal ovality, by reason of the way it is formed. Above surface 12 the neck structure extends outwardly in a outward stretch 13 which terminates in an upward bend 14. Above bend 14 is a thin, tapered upward-inward extending flange 16, the inner edge of which is of greater diameter than the diameter of surface 12. Below surface 12 the neck extends downwardly-outwardly in a slanted stretch 17 which terminates in a short vertical stretch 18, there being an inward directed substantially horizontal upper shoulder 19 below surface 18. Vertical stretch 21 extends downwardly from the inner edge of shoulder 19 terminating in an inwardly curved portion 22 which merges with an outward-downward stretch 23. An approximately vertical short surface 24, which has a greater diameter than surface 18, terminates in a second or lower horizontal inward directed shoulder 26. Vertical stretch 27 depends from the inner edge of shoulder 26, merging with an outward bend 28 which merges with an outward-downward stretch 29. The lower end of stretch 29 merges with a downward stretch 30 which, in turn, merges an inward-downward stretch 31.

In accordance with one form of standard blow molding practice, a parison of plastic material from which the container is to be formed is deposited in the split mold. It will be understood that the type plastic used to mold the container and the neck may be any suitable relatively hard plastic such as polyethylene. Air is blown into the parison to expand it to fill the mold. In one form of the present invention, the mold has an insert which shapes the finish of the neck of the container heretofore described and above the neck insert the mold widens out to establish what is known as a blow dome of excess material. In accordance with one form of the present invention, as distinguished from prior neck finishes, the blow mold is severed at the inner edge of flange 16, as by trimming. Severing the edge of the neck from the blow dome may cause a rough surface. One of the advantages of the present invention is that the edge of flange 16 at which the blow dome is severed is not the primary sealing surface. Instead, primary seal surface 12 is located below and removed from the trimmed edge of flange 16.

The blow dome may be severed or sheared from the neck by such methods as trimming to diameter, or by other methods including a subsequent shearing operation on a separate machine or including the use of shear inserts on the molding apparatus. Other well-known means may shear the blow dome from the neck finish so long as the shear edge is not the primary sealing surface. Likewise, other means may be used for terminating the inner edge of flange because that the inner edge does not engage the cap used therewith in a sealing fashion.

Directing attention to FIG. 2, a blow dome 33 has an outward-upward slanted stretch 34 merging into a curved stretch 36 which has an inward slanted stretch 37. The cut line 38 is a circle wherein the stretch 34 is severed from the inner edge of flange 16. Preferably flange 16 should terminate so that it does not engage the plug of the cap in a sealing fashion. By reason of the almost 180° bend 14, and the rapid diameter changes within a relatively short vertical distance, flange 16 is thin and flexible.

One form of closure or cap 41 used with the present invention is shown in FIGS. 3–7. The closure of FIGS. 3–7 comprises an indented circular top 42 having a short peripheral cylindrical upward extending member 43 from which extends outwardly a stack rim 44. The outer edge of rim 44 has a depending downward stretch 46 which merges into a vertical, substantially cylindrical upper outer skirt 48. The lower end of upper outer skirt 48 merges into an outward-downward slanted stretch 55. Below stretch 55 is a substantially cylindrical lower outer skirt 49. An internal score line or line of weakness 51 separates stretch 55 from lower skirt 49. Below lower skirt 49, cap 41 has an outward-downward slanted flange 52 which, for practical purposes, rests against outward-downward surface 29 of neck 11. Interrupted upper inner bead sections 53 engage under shoulder 19 of neck 11. Lower inner bead 54 located at the lower end of skirt portion 49 engages under shoulder 26 of neck 11. When cap 41 is attached to neck 11, beads 53 and 54 prevent cap 41 from being removed from neck 11. In order to enable the user to grip cap 41, ribs 50 extend outwardly from upper outer skirt member 48 merging with the outer surface of lower skirt portion 49 as best shown in FIG. 7. Ribs 50 also impart columnar strength to the closure to transfer vertical force and prevent closure collapse during axial application of the closure to the neck finish.

At one portion of the circumference of lower skirt 49, as best shown in FIGS. 5 and 6, spaced outwardly therefrom is a horizontal pull tab 57 having a curved connection 58 to lower skirt 49. The interior of skirt 49 is formed with a notch 59 where tab 57 joins lower skirt 49. Notch 59 forms a vertical line of weakness through lower skirt 49. Enlargement 61 is formed on the distal edge of pull tab 57. A portion of flange 52 is formed thinner than the rest of flange 52 in a thin area 62 adjacent tab 57.

Cap 41 includes a downward extension of cylindrical member 43 which forms a depending inner skirt extension 66. The lower inner edge of depending inner skirt extension 66 is formed with a radius 67. The inner surface of cylindrical member 43 seals against primary seal surface 12. A vertical position of cap top 42 can be adjusted to provide for compression of surface 12 against the adjacent surface of member 43.

Directing attention to FIG. 7 it will be seen that the surface 12 is the primary sealing surface against the member 43. As has been noted, the surface 12 is very smooth and hence forms a very effective seal against the member 43.

When the cap is applied, beads 53 and 54 lock under shoulders 19 and 26 to prevent removal of cap 41 from neck 11 and hence are tamper evidencing. When the user wishes to open the container, the user grips the enlargement 61 and bends pull tab 57 outwardly and then pulls circumferentially, tearing lower skirt 49 from upper cap portion, namely, from upper skirt 48. The user may then grip under surface 55 which, as shown in FIG. 7, is spaced from the bottle neck finish by a considerable gap, and pull upwardly causing the interrupted upper bead segments 53 to disengage from shoulder 19 so that cap 41 may be removed from neck 11. The ribs 50 rigidify the upper portion of the cap to allow the forces necessary to push the cap onto the bottle from causing the cap to buckle. The portion of the cap above score line 51 constitutes a reclosure cap 41 and may be pressed back on neck 11 after portions of the contents of the jar or container are dispensed as frequently as required.

Comparison of FIG. 7 with prior art structure shown in FIG. 8 shows that in the present invention the very smooth surface of primary seal surface 12 causes a tight seal against the exterior of member 43 and flange 16 need not seal at all, whereas in the prior art the cut inner edge of flange 16a is a primary seal. The primary seal surface 12 of the present invention has minimum deviation from ovality as compared to FIG. 8 where the prior primary seal 12a is coincident with a trim surface of flange 16a. Bottles of the type of this invention and the prior art were molded. The ovality of the two types was measured. The unexpected result of these experiments was that the current invention produced a significantly more circular primary seal area 12. Refer to Table A for tabulated results. The stretch occurring on both sides of the primary seal 12 is primarily contributing to the superior ovality and differentiate it from the prior art.

TABLE A

| STD BOTTLE STYLE | | | | PRESENT INVENTION | | | |
|---|---|---|---|---|---|---|---|
| Run A | Run B | Run C | Run D | Run A | Run B | Run C | Run D |
| 0.055 | 0.020 | 0.048 | 0.028 | 0.024 | 0.058 | 0.002 | 0.015 |
| 0.053 | 0.002 | 0.056 | 0.015 | 0.006 | 0.010 | 0.106 | 0.030 |
| 0.062 | 0.000 | 0.044 | 0.010 | 0.017 | 0.002 | 0.013 | 0.010 |
| 0.043 | 0.010 | 0.058 | 0.003 | 0.016 | 0.004 | 0.005 | 0.027 |
| 0.058 | 0.029 | 0.025 | 0.009 | 0.014 | 0.013 | 0.005 | 0.034 |
| 0.064 | 0.016 | 0.055 | 0.003 | 0.011 | 0.060 | 0.017 | 0.017 |
| 0.011 | 0.005 | 0.059 | 0.002 | 0.004 | | 0.003 | 0.017 |
| 0.019 | 0.013 | 0.049 | 0.005 | 0.007 | | | |
| 0.042 | 0.006 | 0.045 | 0.002 | 0.013 | | | |
| Average 0.028 | | | | Average 0.016 | | | |

FIG. 9 illustrates a modified shape of a neck 11b wherein seal surface 12b is cylindrical rather than curved. As shown in FIG. 9, the seal surface can be vertical, such as seal surface 12b, or it may be curved, such as seal surface 12 shown in FIG. 2.

Figure 10:
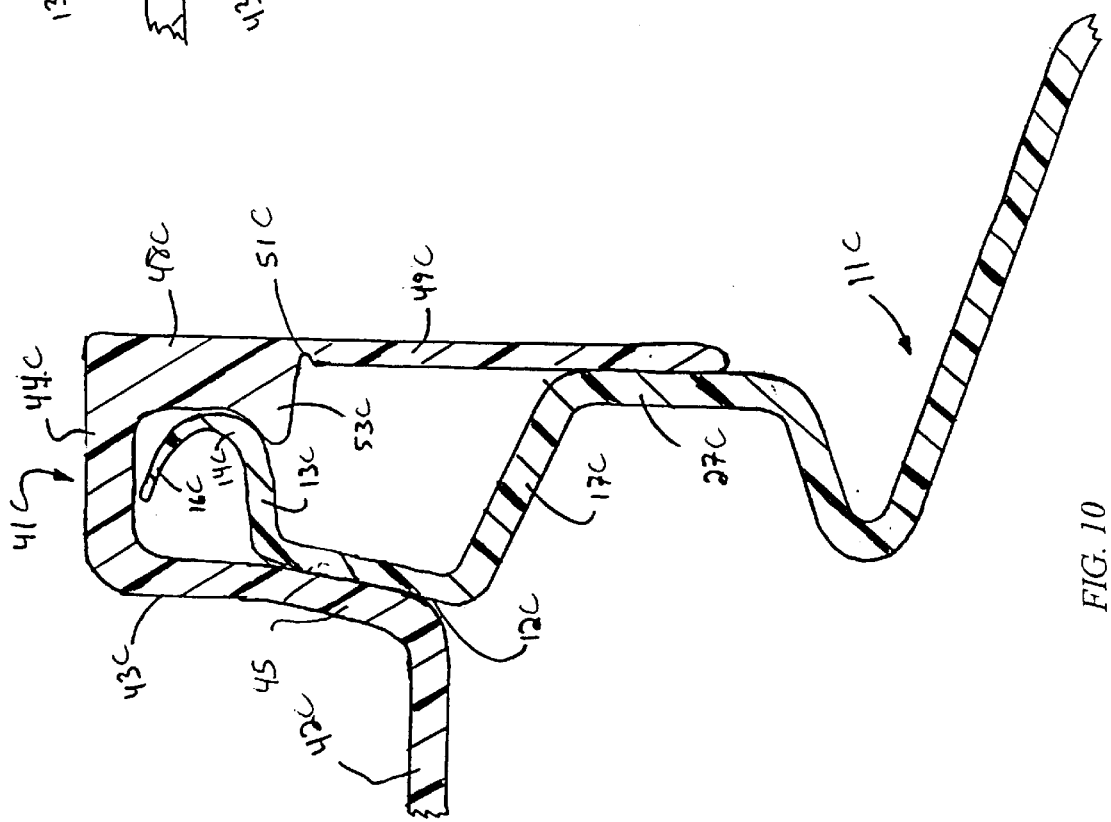
FIG. 10 is a view similar to FIG. 7 of a modified neck and cap.
Figure 12:
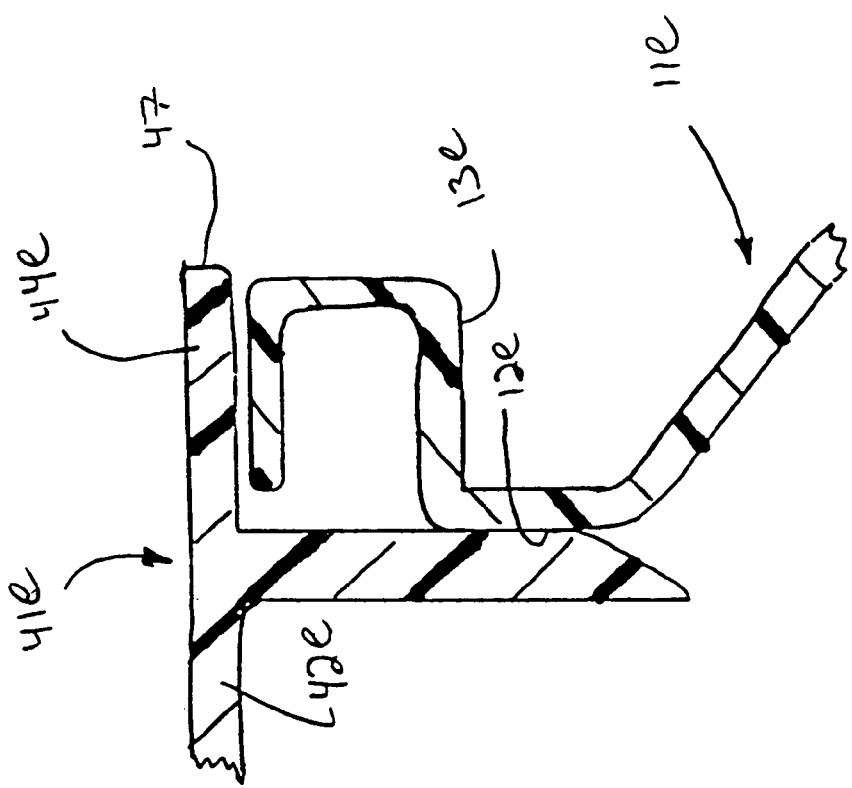
FIG. 12 is view similar to FIG. 7 of another modified neck and cap.

Directing attention to FIGS. 10–12, various other modifications may also be made to the neck and cap of the present invention. For example, FIG. 10 discloses an embodiment in which the primary sealing surface is disposed non-vertically and is instead an angled surface, such as seal surface 12c shown in FIG. 10. Upwardly extending member 43c of cap 41c includes a lower frustoconical portion 45 which depends from top 42c at an angle. Neck 11c includes a non-vertical, very smooth sealing surface 12c, an outward bend joining said sealing surface 12c to an outward stretch 13c, an upward bend 14c joining outward stretch 13b to a flange 16c. Surface 12c is the primary sealing surface against lower portion 45 of member 43c. The very smooth surface of primary seal surface 12c causes a tight seal against the exterior of member 43c whereby flange 16c, which is joined to outward extending stretch 13c, need not seal at all. The embodiment shown in FIG. 10 includes a further modification in which a lower portion of lower skirt 49c frictionally engages vertical stretch 27c thus obviating need for an inner bead. An internal score line 51c separates lower skirt 49c from upper skirt 48c.

FIG. 11 discloses an alternative embodiment of the neck and the cap. Neck 11d includes a very smooth sealing surface 12d, an outward directed stretch 13d joining sealing surface 12d to an upward directed stretch 130, and an inward directed stretch 131 joined to upward stretch 130. Inward stretch 131 terminates in an edge 132 which has a diameter greater than the diameter of seal surface 12d and of member 43d. The very smooth surface 12d causes a tight seal against the exterior of member 43d whereby edge 132 need not seal at all. The embodiment shown in FIG. 11 includes a further modification in which cap 41d includes a skirt 48d having an upper inner bead 53d, and a lower skirt 49d having a lower inner bead 54d. An internal score line 51d may separate lower skirt 49d from upper skirt 48d.

FIG. 12 discloses an alternative embodiment of the cap without an outer skirt which may be used with the various neck embodiments discussed above. Cap 41e includes a top 42e having a cylindrical downwardly extending member 43e and an outwardly extending stack rim 44e. Similar to the above embodiments, seal surface 12e causes a tight seal against the exterior of member 43e. Cap 41e differs in that outwardly extending rim 44e terminates in an outer edge 47 whereby cap 41 has no skirt. As noted above, such an outer skirt is not a necessary feature of the present invention because the primary sealing action takes place between the outer surface of the central plug and the sealing surface of the neck, i.e., between member 43e and seal surface 12e. In the absence of a skirt, other types of tamper-evidencing methods may be employed, for example, shrink-wrapping (not shown). Furthermore, in the absence of a skirt, other methods may also be employed to shield the upper external portion of the neck from debris and contamination. Shrink-wrapping, for example, may again be employed to shield portions of the neck that are otherwise covered by a skirt from dirt.

Figure 14:
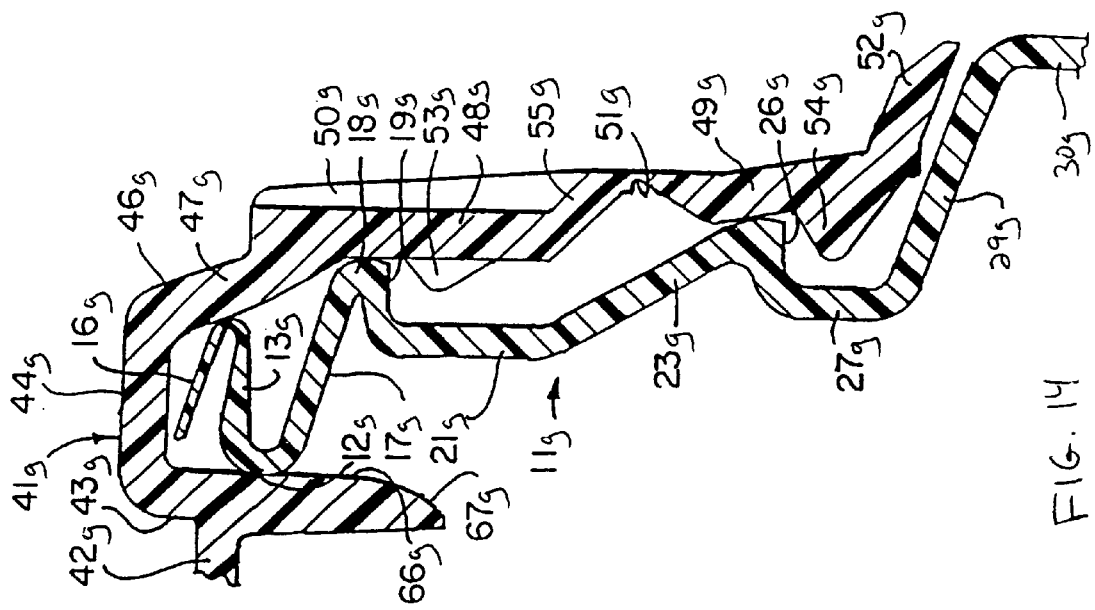
FIG. 14 is a view similar to FIG. 7 of another modified neck and cap.
Figure 13:
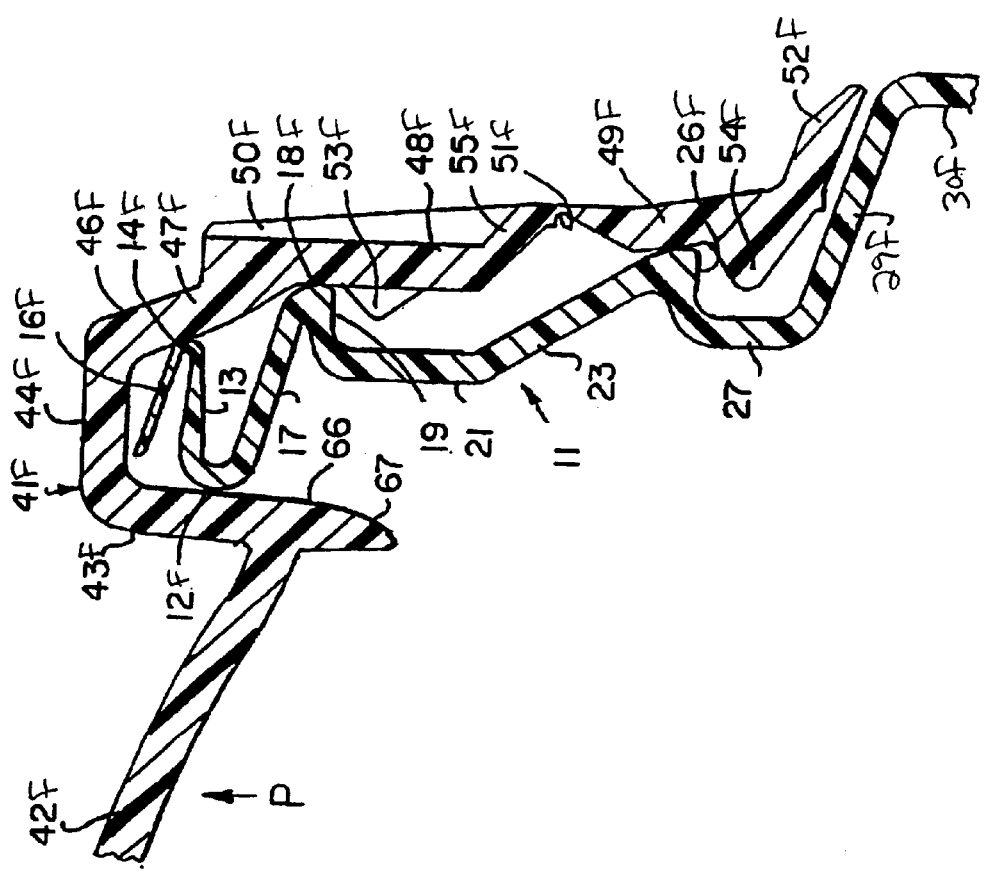
FIG. 13 is a view similar to FIG. 7 showing possible distortion of the cap top if pressure is applied to the container.

With reference to FIGS. 13–15, if the contents of the container are non-viscous (e.g., brine-packed pickles) or if the walls of the container are easily squeezed during transportation or handling, top 42f may be subjected to upward pressure, as indicated by arrow "P" in FIG. 13, causing it to become "domed" (outwardly convex). Such action may cause inner skirt member 43f to pivot away from curved primary seal 12f, resulting in leakage. This effect is illustrated in FIG. 13.

FIG. 14 shows one remedy for such leakage. Contrasting FIG. 14 with FIG. 7 it will be seen that top 42g is raised relative to stack rim 44g and that the contact of surface 12g with inner skirt member 43g is more closely opposite top 42g. FIG. 14 also shows a structure in which top 42g is closer to the level of rim 44g than in the above embodiments. Surface 12g engages the surface of cylinder 43g below the level of top 42g. In addition, reducing the vertical spacing between top 42g and stack rim 44g reduces the lever arm and corresponding mechanical advantage of the inward force component generated by internal pressure. Hence doming of top 42g does not result in pivoting of skirt 66g out of sealing contact with surface 12g. As noted above, FIG. 13 shows how pressure applied to the container (as by squeezing the side wall) may cause top 42f to bow upward, pulling plug 66f away from such surface 12f.

FIG. 15 shows another remedy for leakage due to doming of surface 42h. A plurality of angularly spaced, substantially radially gussets 71 are formed at the intersection of top 42h and cylindrical member 43h. Gussets 71 prevent member 43h from pivoting away from surface 12h. A similar result can be achieved by replacing gussets 71 with a continuous reinforcing bead or shoulder at the intersection of the exterior surfaces of top 42h and member 43h.

Figure 17:
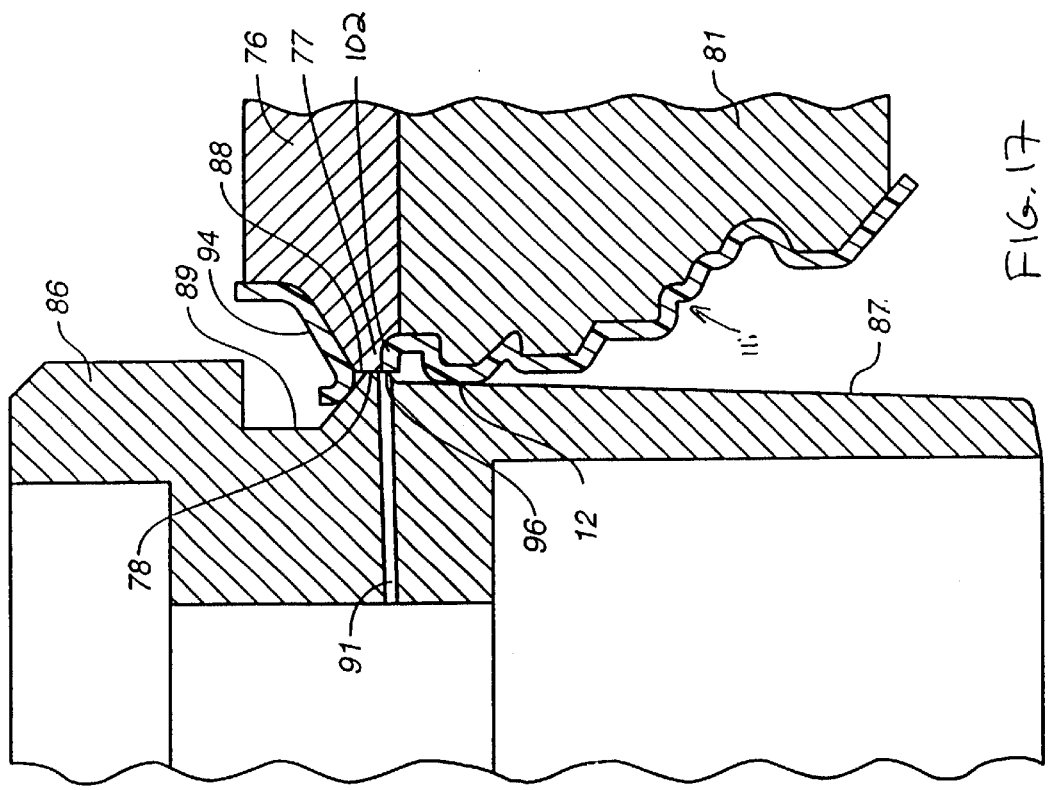
FIG. 17 is a view similar to FIG. 16, showing the blow pin in a raised position.
Figure 16:
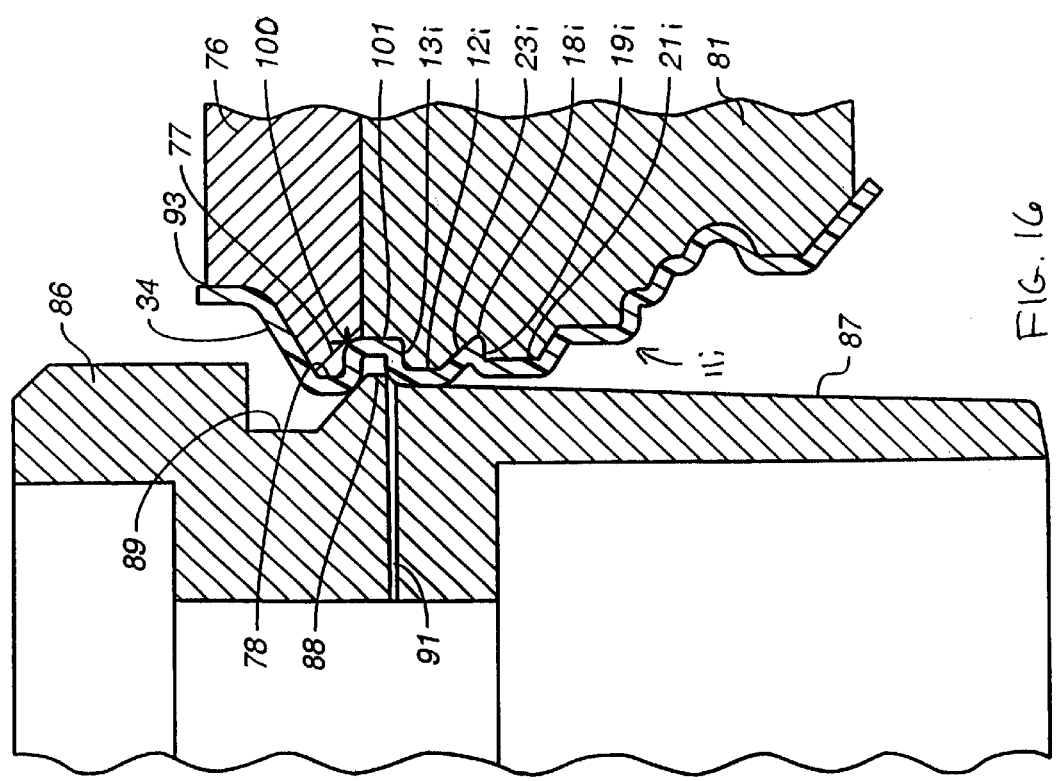
FIG 16 is a vertical sectional view through a modified container neck and portions of a mold and a blow pin forming same.

As shown in FIGS. 16 and 17, another way to achieve the neck structure of the present invention is to employ what is commonly referred to as "pull-up" trim. In this case, the cut line is sheared by having a close diametrical fitting of a blow pin positioned internally within the parison and sets of shear steels mounted on the split mold. Diameters of the blow pin are typically 0.001 inch to 0.004 inch smaller than that diameter defined by the shear steels in closed position. After blowing of the neck and the container, a portion 34i of the parison above the cut line is severed from the neck portion below the cut line by upward movement of the blow pin relative to the shear steels as shown in FIG. 17.

The modification shown in FIGS. 16 and 17 illustrates the formation of a modified container neck 11i. Such a neck may resemble that shown in FIGS. 1 and 2 of U.S. Pat. No. 4,699,287, ("the '287 patent") with an important modification, as hereinafter explained. In FIG. 16, the parison forming neck 11i is shown between a blow pin 86 and shear steel 76 and neck insert 81 as molding is being completed.

With continued reference to FIG. 16, shear steel 76 has an inward projection 77 terminating in a vertical inward extending shearing edge 78. Blow pin 86 has a lower cylindrical portion 87 having an outward extending shearing edge 88 with a groove 89 thereabove.

As shown in FIG. 16, blow molding of the parison to the shape of shear steel 76 and neck insert 81 has just been completed. The shape of the parison generally resembles the neck shown in the '287 patent. Edge 88 is located below edge 78. Air blowing through hole 91 has formed vertical stretch 101 of flange 100 and inward horizontal stretch 102 as well as the portions thereabove. The smooth, vertical, lower cylindrical portion 87 has formed internal primary seal surface 12i.

The blow pin 86 then moves from the position of FIG. 16 to the position of FIG. 17. The neck structure is sheared between edges 78 and 88. Inner flange edge 96 of neck 11i is formed where the edges 78, 88 have sheared the same and the parison sheared-off portion 94 thereabove is discarded.

It is noted that edge 96 is of a larger diameter than primary seal surface 12i. Hence, a hollow plug or inner skirt such as that shown in the '287 patent seated on container neck 11i seals against surface 12i instead of surface 96. Since blow pin 86 has no parting line, surface 12i has no flash, that is, a parting line or parting line defects. Surface 12i is smooth and its diameter is always the same during repetitive molds and hence makes a superior seal with the cap plug.

Figure 18:
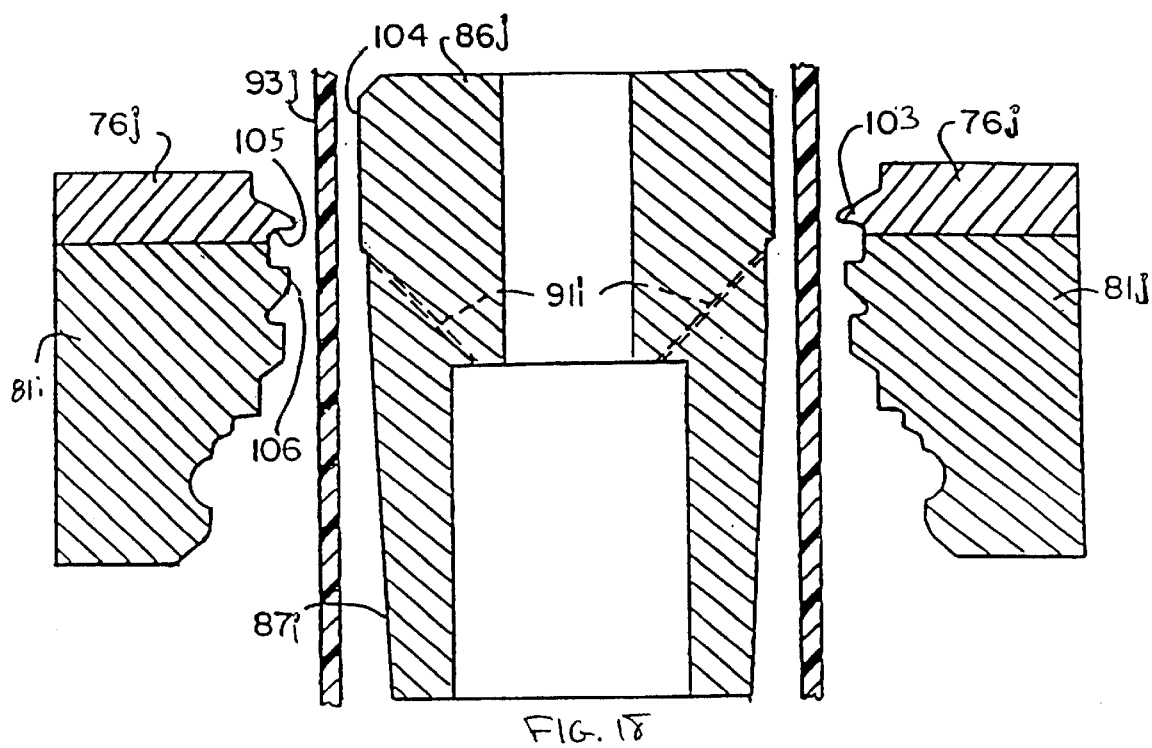
FIG. 18 is a fragmentary vertical sectional view through a portion of a mold, a blow pin and parison, with the mold in an open position.
Figure 19:
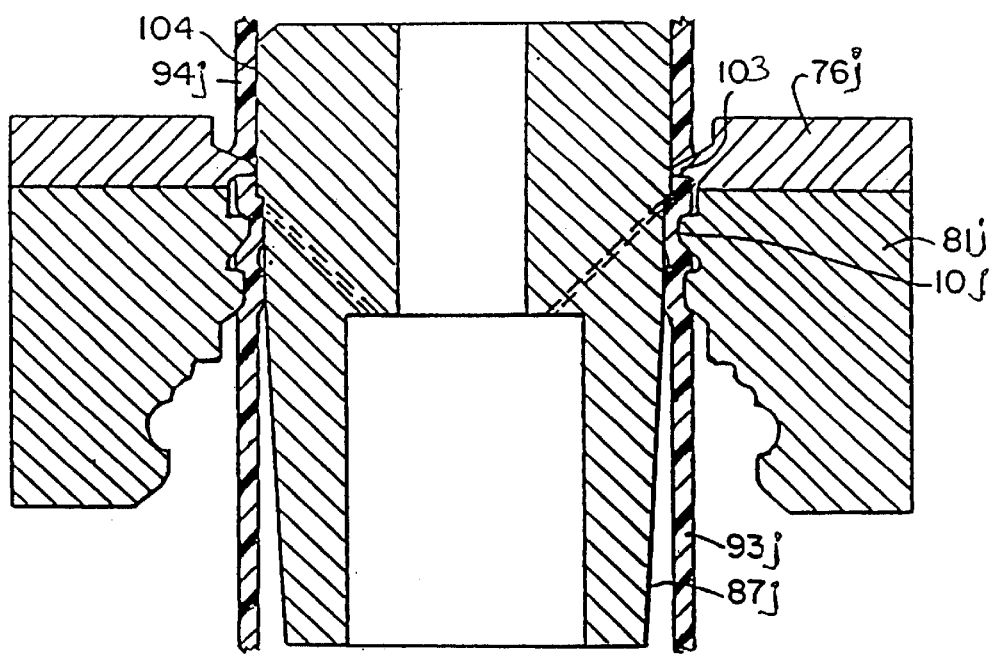
FIG. 19 is a view similar to FIG. 18 with the mold in a closed position.
Figure 20:
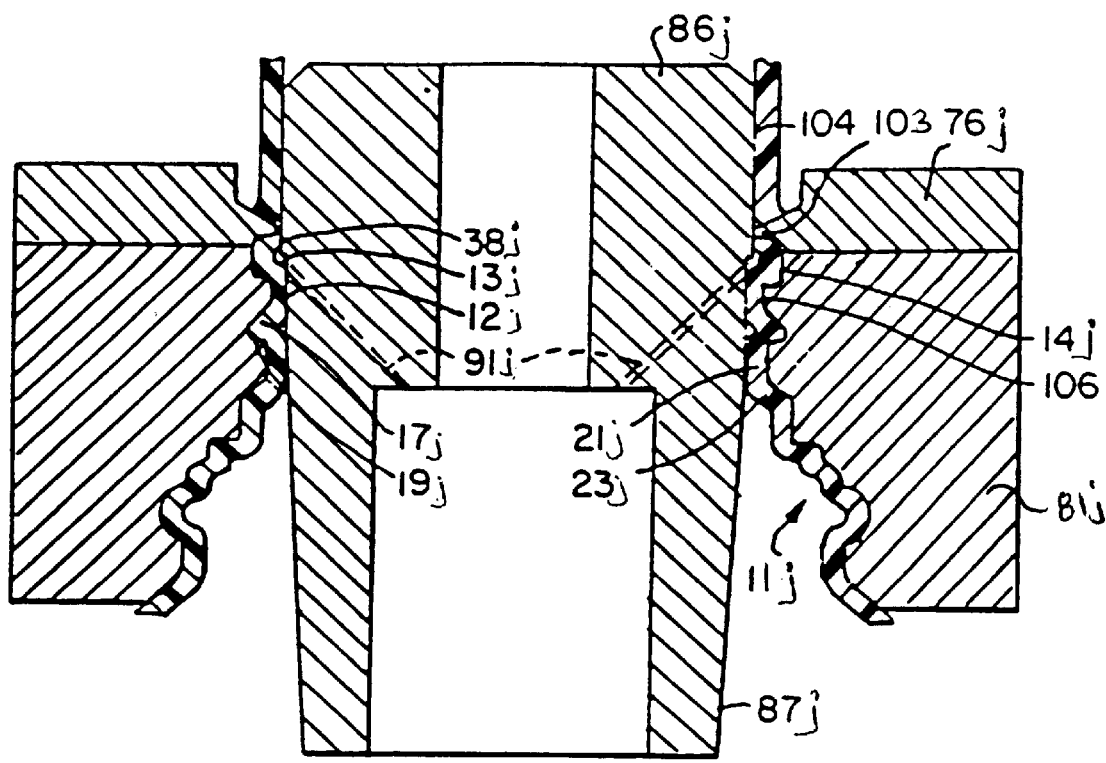
FIG. 20 is a view similar to FIG. 19 after air has been blown into the mold.

Directing attention to FIGS. 18–20, shear steel 76j has an inward directed cutting edge 103, the inside diameter of which is approximately equal to the enlarged diameter of the upper portion 104 of blow pin 86j. Below cutting edge 103 is an undercut 105. Neck insert 81j has a seal forming projection 106 which has an inside diameter which is greater than the outside diameter of cylindrical portion 87j of blow pin 86j by a distance slightly less than the thickness of parison 93j.

When the neck molds are closed, the cutting edge 103 cuts off upper portion 94j of the parison by reason of edge 103 engaging enlarged outside diameter portion 104 of blow pin 86j. Seal forming projection 106 squeezes the parison against blow pin lower portion 87j to form a smooth, compressed primary seal surface 12j.

As shown in FIG. 20, when air is blown through the pin 86j, the parison assumes the shape of neck insert 81j. Thus, neck 11j has a primary seal surface 12j, an outward stretch 13j, a bend 14j, and a cut line 38j. The inside diameter of cut line 38j is slightly greater than the primary seal surface 12j. In other respects the shape of the neck 11j resembles that of FIG. 17.

Figure 21:
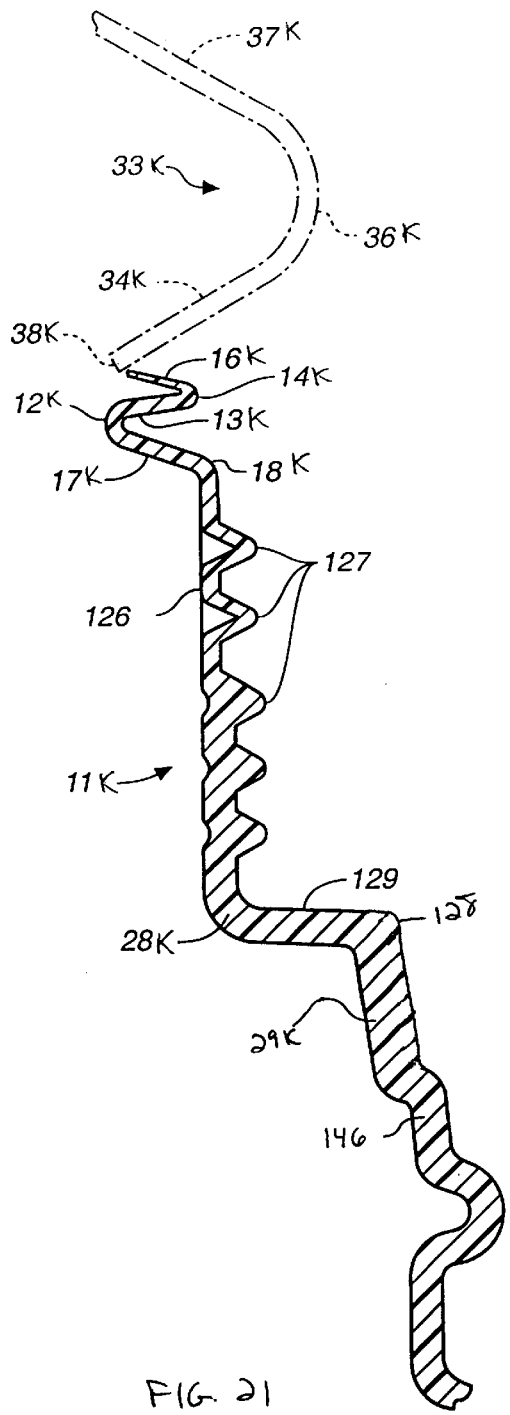
FIG. 21 is a view similar to FIG. 2 of a modified neck wherein screw threads are formed on the exterior of the neck.
Figure 22:
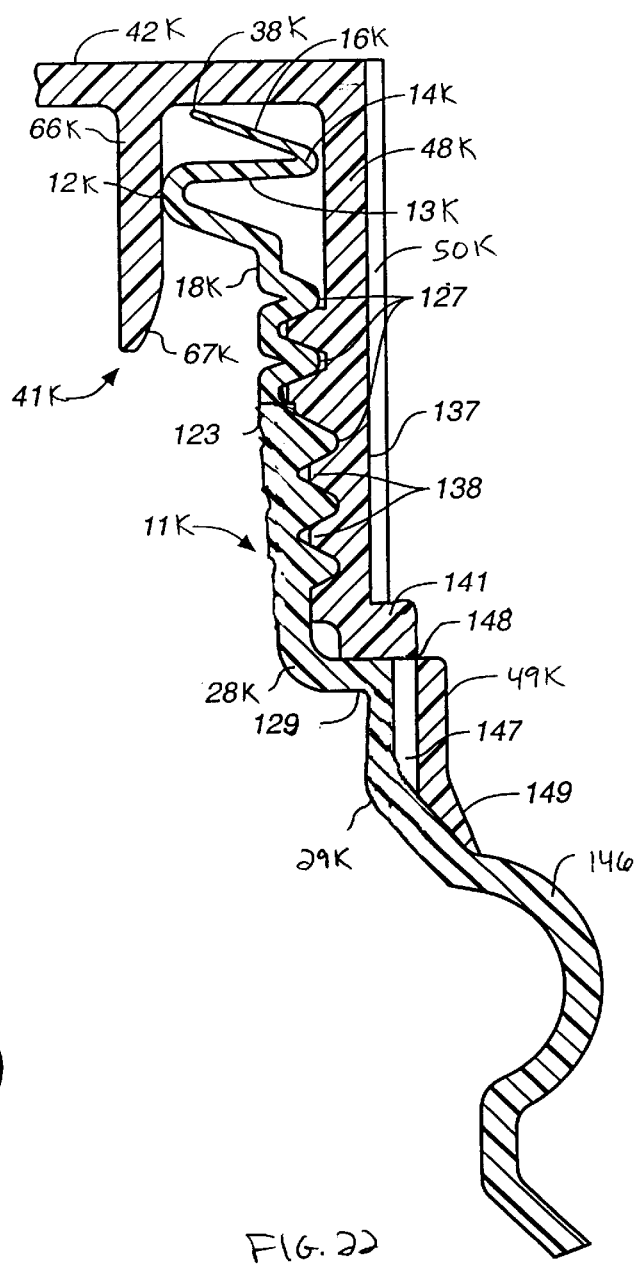
FIG. 22 is a view similar to FIG. 7 showing the neck of FIG. 21 with a cap applied thereto.

Directing attention to FIGS. 21 and 22, neck finish 11k and the portion above the neck finish formed in blow dome 33k resembles that of FIG. 2 except that screw threads 127 are formed on the exterior of upper neck surface 126. Below threads 127, the neck has an outward curved portion 28k which merges with horizontal shoulder 129 against which shoulder 141 on the bottom edge of cap lower skirt 49k rests. Depending from shoulder 129k are lower ratchet teeth 128 and below teeth 128 is a remainder 146 of neck 11k.

Vertical stretch 137 of cap 11k is formed with internal threads 138 which mesh with threads 127. On the exterior of upper cap skirt 48k are vertical ribs 50k and on the lower end of stretch 137 is outward directed shoulder 141 from which depend ratchet teeth 147 which mesh with ratchet teeth 128. Lower skirt 49k is joined to shoulder 141 at juncture 148. Juncture 148 is frangible so that lower skirt 49k and internal ratchet teeth 147 thereof may be removed to permit the cap to be unscrewed from the neck. Fracture of juncture 148 indicates tampering with the contents of the container.

Below lower skirt 49k is a downward-outward directed flange 149 which is in close proximity to remainder 146 of the neck so as to prevent foreign matter from entering between the ratchet teeth.

Figure 23:
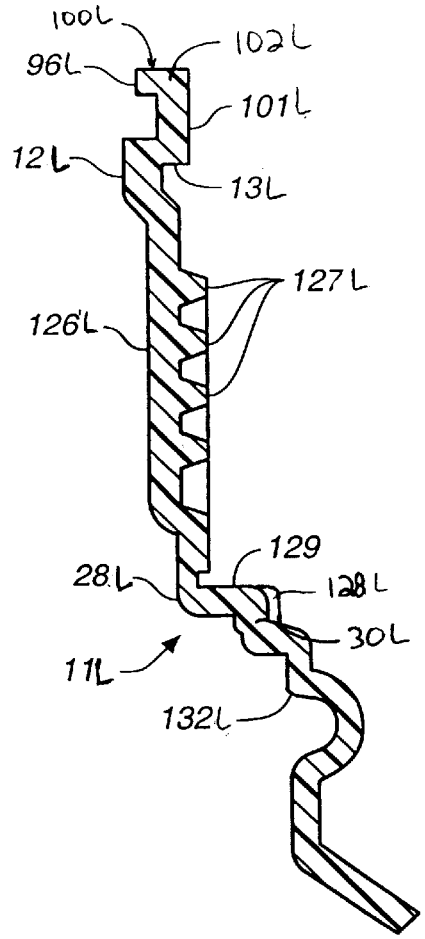
FIG. 23 is a fragmentary vertical sectional view through a portion of a modified neck similar to that shown in FIG. 22.
Figure 24:
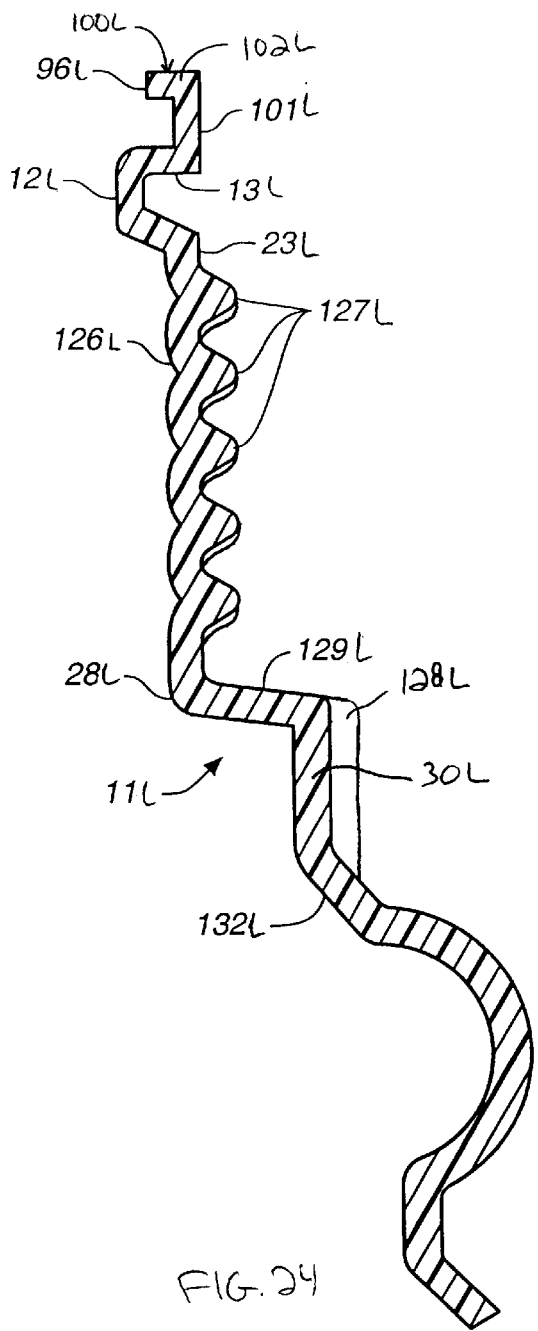
FIG. 24 is an enlarged view of neck structure similar to that shown in FIG. 23.

FIGS. 23 and 24 illustrate a modified neck finish 11l similar to that shown above and having external screw threads 127l formed on the neck structure to replace the snap-on structure described above with reference to FIG. 11. FIG. 24 is an enlarged view of a portion of FIG. 23 showing the positioning of ratchet teeth 128l which are interengaged by internal ratchet teeth on the lower portion of a cap skirt similar to that shown in FIG. 22.

Figure 25:
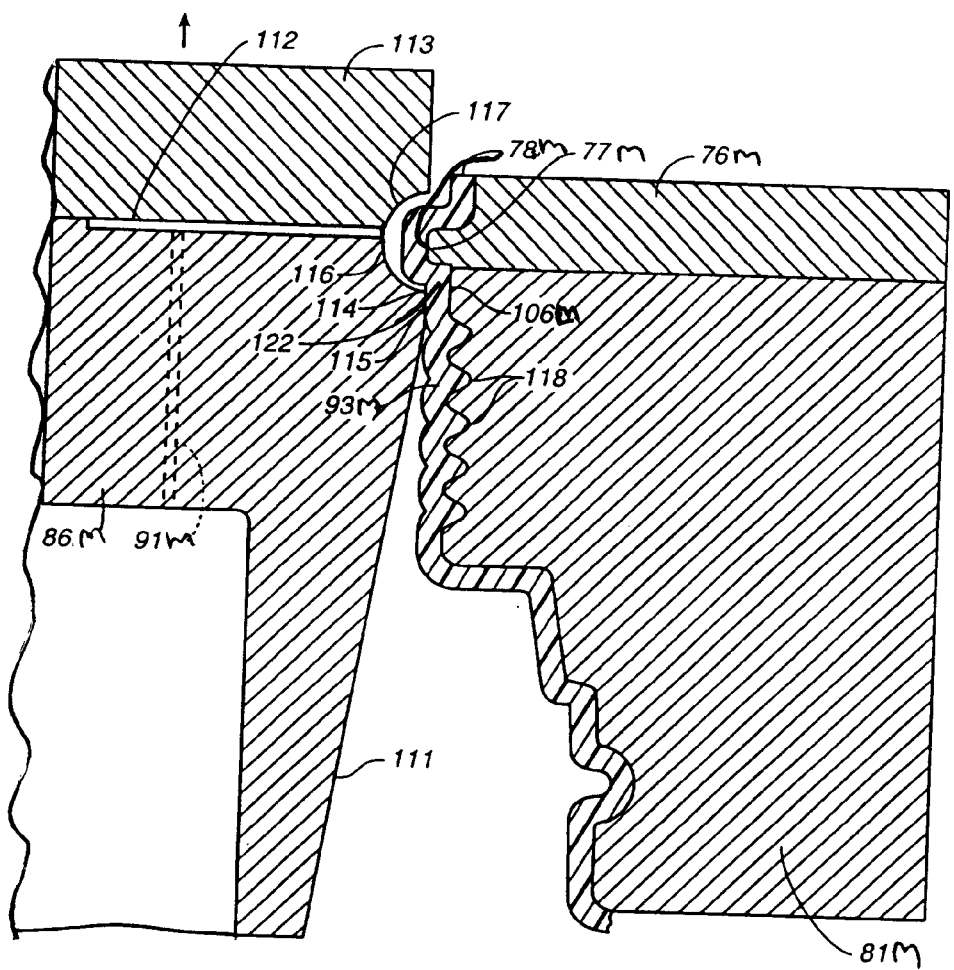
FIG. 25 is a fragmentary sectional view similar to FIG. 20 of a further modified mold and blow pin assembly with parison after air has been blown into the mold.

Directing attention now to FIG. 25, a different shape neck is produced by the mold parts therein illustrated. Blow pin 86m has a lower tapered portion 111 at the upper end of which is a vertical cylindrical surface 115 which is smooth and terminates at its upper end in a shear corner 114. Above corner 114 is a cut-away 116. Blow pin 86m may be made of two parts in order to facilitate fabrication. As shown in FIG. 25, lower portion 86m is attached to upper blow pin portion 113 and radial grooves or channels 112 are cut in the top surface of blow pin 86m, the channels 112 being connected to vertical air holes 91m. Thus when air is blown into blow pin 86m air travels up holes 91g and out channels 112. The lower corner of upper blow pin 113 is formed with a cut-away 117 which merges with cut-away 116 to clear inward shearing edge 78m of inward extension 77m of shear steel 76m. The upper end of neck insert 81m is formed with seal forming projection 106m which presses the parison against surface 115. The neck formed in neck insert 81m has external threads and hence grooves 118 for such threads are formed therein. Below the threaded portion of the neck, the bottle may assume any desired shape and hence the details of neck insert 81m which form the same are not specifically set forth.

After the neck has been blown, as shown in FIG. 25, the blow pin 86m is raised and hence the shear corner 114 shears off the parison by shearing action against edge 78m. Thus the neck has a straight upward section 122 which is a smooth sealing surface characterized by the absence of mold parting lines and also characterized by the absence of rough edges.

Figure 26:
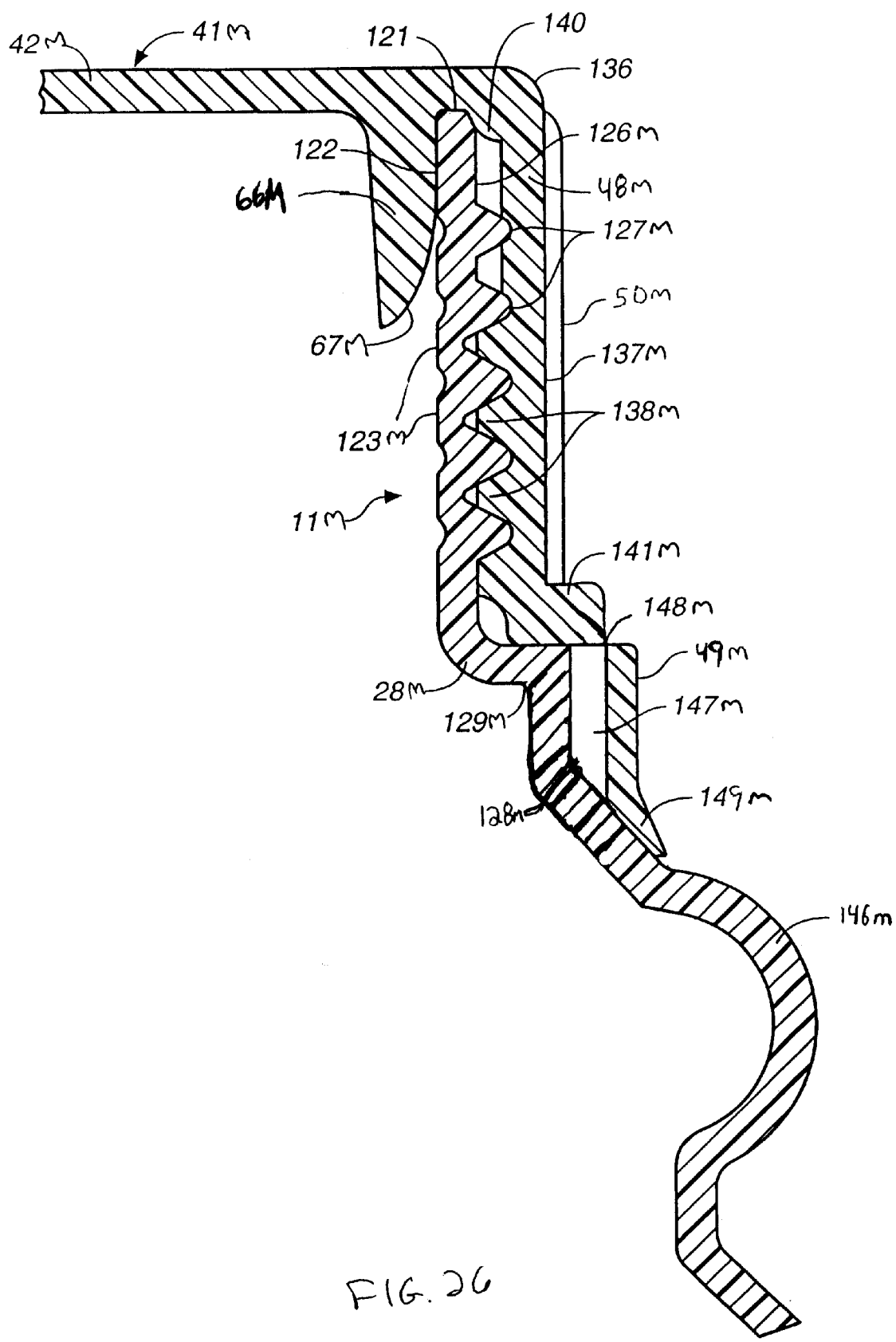
FIG. 26 is a fragmentary sectional view of a neck formed by the mold and blow pin assembly of FIG. 25 and a cap seated thereon.

Directing attention to FIG. 26, the neck 11m formed in the mold parts shown in FIG. 25 is illustrated with a cap 41m snapped thereon. Thus neck 11m has an upper lip 121 below which is a vertical, smooth, seamless seal surface 122 with an enlarged diameter portion 123m therebelow. On the outside of the neck 11m there is an upper, vertical, straight surface 126m below which are external threads 127m. Below the threads is an outward curved portion 28m which merges with an horizontal shoulder 129m. Below the shoulder 129m are outward extending vertical ratchet teeth 128m, and below the teeth 128m is remainder 146m of the neck.

Cap 41m has a top 42m with a vertical outer skirt 48m depending from the outer edge thereof. Upper skirt 48m is connected to lower skirt 49n as hereinafter appears. The upper edge of skirt 48m is connected to top 42m by corner 136, and below corner 136 is a substantially vertical stretch 137m, the inner surface of which is formed with internal threads 138m which mate with external threads 127m of neck 11m. On the exterior of upper skirt 48m are vertical ribs 59m which assist the user in unscrewing the cap. An inner filet 140 is formed at the juncture of the underside of top 42m and the inside of upper skirt 48m. The purpose of fillet 141 is to exert pressure against the upper portion of the neck 11m to force seal surface 122m outwardly. The inner surface of lower skirt 49m is formed with ratchet teeth 147m which mate with teeth 128*m*. The upper inner corners of teeth 128*m* are joined to shoulder 141*m* on the lower end of upper skirt 48*m* at frangible juncture points 148*m*. Below lower skirt 49*m* is an outward, downward slanted flange 149*m* which engages the outside of skirt portion 29*m*.

Depending from top 42*m* is a plug or inner skirt 66*m* having a radius 67*m* at its lower, outer corner. When the neck 11*m* is forced outwardly by fillet 140, it tightly engages the outside surface of plug 66*m* to form a liquid tight seal.

It will be seen that the cap shown in FIG. 26 is tamper-evidencing. When the cap 41*m* is unscrewed, the junctures 148*m* fracture, permitting the cap to be unscrewed but so long as the junctures 148*m* are intact, evidence that the cap has not been opened appears.

Figure 28:
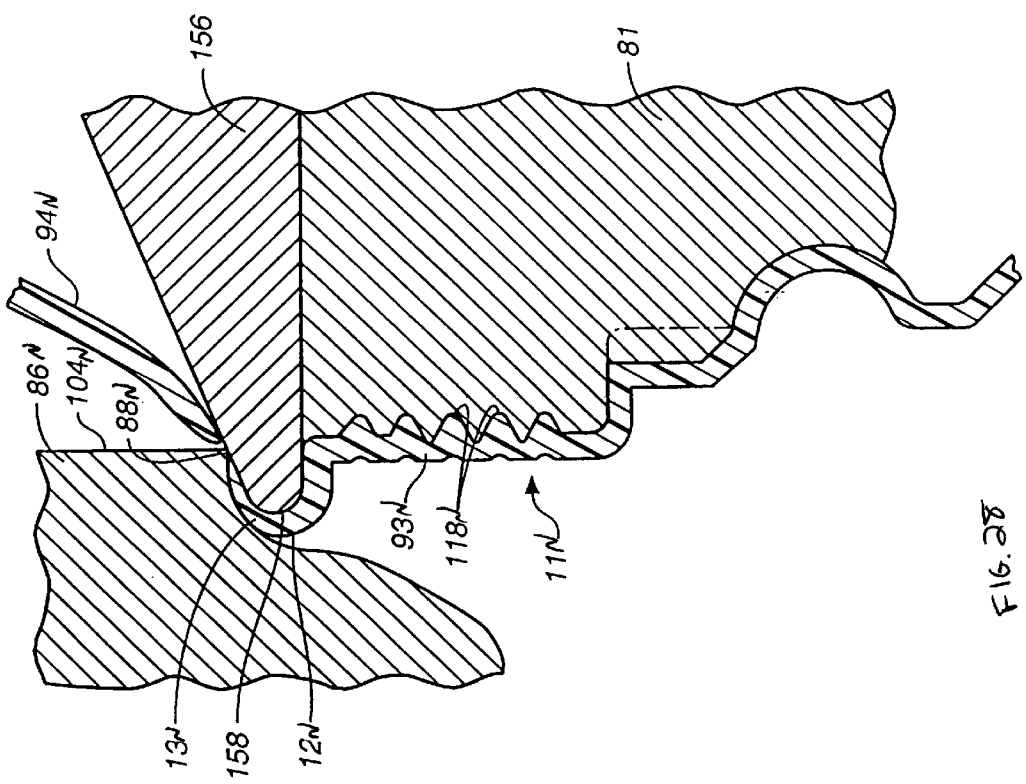
FIG. 28 is a view similar to FIG. 27 showing the blow pin in lowered position.
Figure 27:
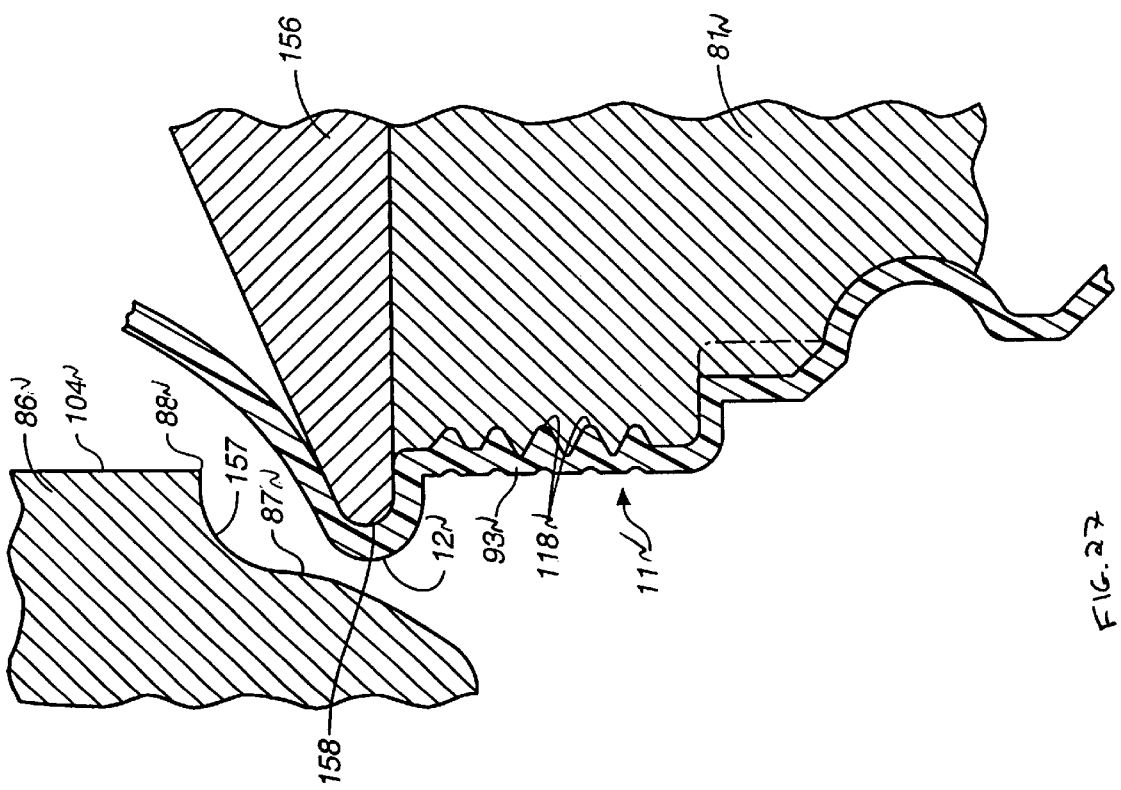
FIG. 27 is a view similar to FIG. 25 of another modified mold, blow pin and parison showing the blow pin in raised position.

Directing attention to FIGS. 27–28, a neck similar to that of FIG. 26 is produced. The molding process used is generally known as "ram down" molding in that the blow pin 86*n* is forced down on striker plate 156. Blow pin 86*n* has an upper cylindrical portion 104*n*, a reduced diameter portion 87*n* below portion 104*n*, and a curved portion 157 intermediate portions 87*n* and 104*n*. A corner 88*n* at the juncture of curved portion 157 and upper portion 104*n* comprises a cutting edge. Neck insert 81*n* resembles that of FIG. 25. Above neck insert 81*n* is a striker plate 156 having a rounded point 158 which is opposite curved portion 157 when blow pin 86*n* is in down position, as shown in FIG. 28. The spacing between point 158 and curved portion 157 is slightly less than the thickness of parison 93*n*. As shown in FIG. 28, when pin 81*n* is in down position, cutting edge 88*n* engages striker plate point 158 thereby shearing off parison portion 94*n*. The parison 93*n* is squeezed between point 158 and curved portion 157, thereby creating primary seal surface 12*n*.

Figure 29:
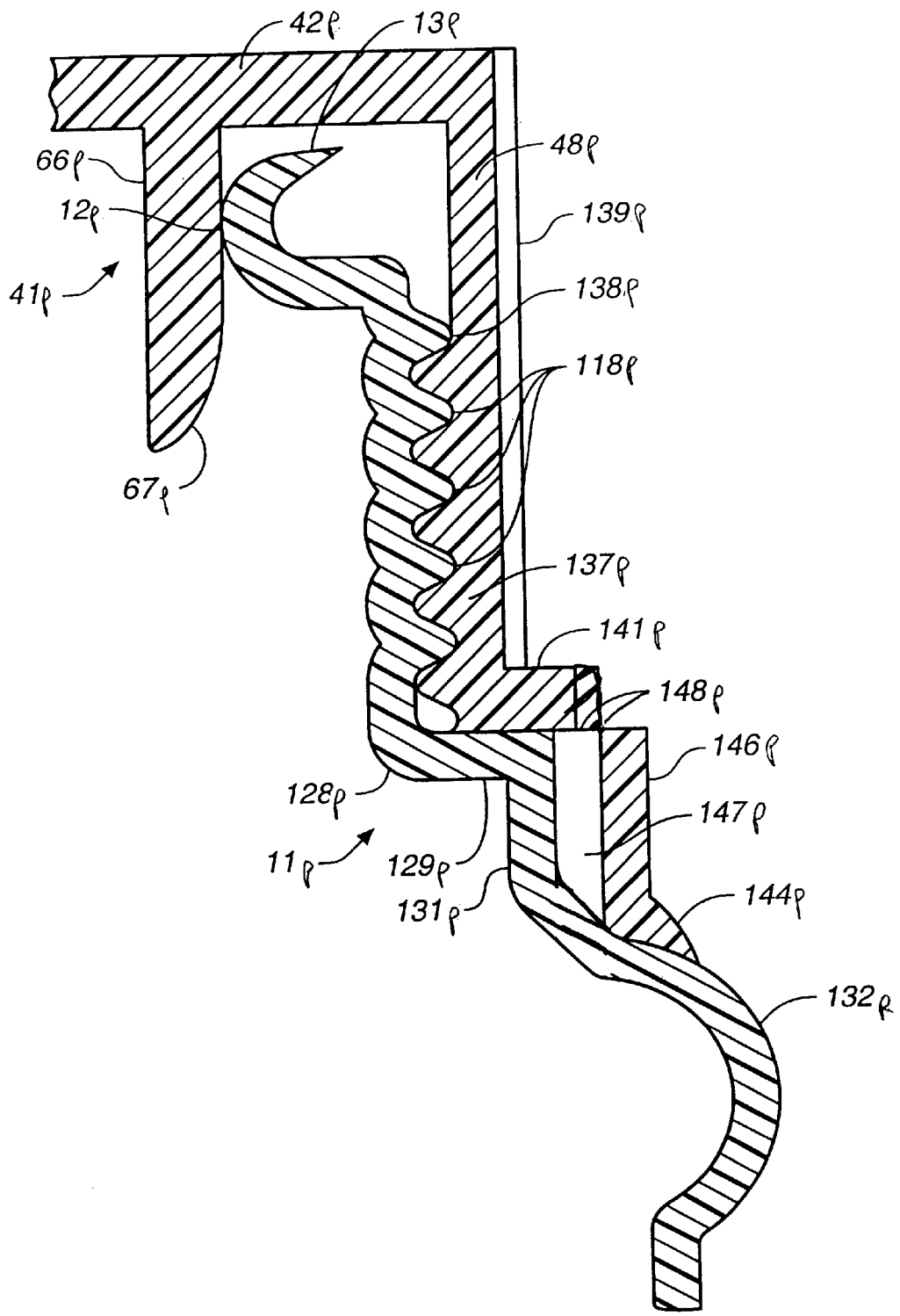
FIG. 29 is a view similar to FIG. 7 showing a neck similar to that shown in FIG. 28 with a cap seated thereon.

FIG. 29 shows the neck structure 11*p* of FIG. 24 with a cap 41*p* seated thereon. Thus it will be seen that the outward stretch 13*p* of neck 11*p* does not engage either the underside of cap top 42*p* nor the plug 66*p* nor the upper skirt 48*p*.

It will be understood that different neck shapes are shown formed by the various types of molds and molding methods illustrated in the drawings and described herein. However the neck shapes and molding techniques may be interchangeable, as will occur to one skilled in the art.

In FIGS. 8–28 the same reference numerals are used for parts corresponding to those elsewhere mentioned, followed by subscripts a, b, c, d, e, f g, h, i, j, k, 1, m, n and p, respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In combination, a neck and a cap for a blow molded plastic container, said cap having a top, said top having an outer edge, and a plug depending from said top, said plug being located inward of said outer edge, said neck comprising a sealing portion having a smooth, internal circumferential primary seal surface characterized by the absence of mold parting line defects sealingly engaging said plug, an outward bend at an upper end of said sealing portion, an upward bend joined to said outward bend, and an inwardly extending flange joined to said upward bend, said flange terminating at a terminus having a circumference greater than that of said sealing portion, said terminus being spaced from said plug and not sealing against said plug, in which said cap further comprises an outer skirt depending from said outer edge of said top, said plug being located inward of said outer skirt with an annular gap between said outer skirt and said plug, a lower skirt depending from a lower skirt portion of said outer skirt and a line of weakness for separating said lower skirt from said outer skirt, neck engaging means on said outer skirt, and in which said neck has a lower neck portion extending outwardly from a lower end of said sealing portion, said lower neck portion having cap engaging means located entirely below said sealing portion, said cap engaging means being positioned to engage said neck engaging means.

2. The combination of claim 1 in which said neck further comprises an outward extending stretch intermediate said outward bend and said upward bend, and an upward directed stretch and an inward blend at an upper end of said upward directed stretch intermediate said upward bend and said inwardly extending flange.

3. The combination of claim 1 in which said plug substantially vertically depends from said top.

4. The combination of claim 1 in which said plug angularly depends from said top.

5. The combination of claim 1 wherein an upward-inward bend is positioned between said upward bend and said flange.

6. The combination of claim 1 in which said neck engaging means on said outer skirt including an inside diameter D1, and in which said cap engaging means having an outside diameter D2, said inside diameter D1 being slightly less than said outside diameter D2 such said neck engaging means frictionally engages said cap engaging means.

7. In combination, a neck for a blow molded plastic container and a cap, said cap having a top, said top having an outer edge and a plug depending from said top, said plug being located inward of said outer edge, said neck comprising a sealing portion having a smooth, internal circumferential primary seal surface characterized by the absence of mold parting line defects sealingly engaging said plug, an outward directed stretch, an inward directed stretch joined to said outward directed stretch terminating in an edge having a diameter greater than the diameter of said seal surface, said edge being spaced from said plug and not sealing against said plug, in which said plug substantially vertically depends from said top.

8. The combination of claim 7 in which said neck comprises an upward directed stretch intermediate said outward directed stretch and said inward directed stretch.

9. The combination of claim 7 in which said cap further comprises an outer skirt depending from said outer edge of said top, said plug being located inward of said outer skirt with an annular gap between said outer skirt and said plug.

10. In combination, a neck for a blow molded plastic container and a cap, said cap having a top, said top having an outer edge and a plug depending from said top, said plug being located inward of said outer edge, said neck comprising a sealing portion having a smooth, internal circumferential primary seal surface characterized by the absence of mold parting line defects sealingly engaging said plug, an outward directed stretch, an inward directed stretch joined to said outward directed stretch terminating in an edge having a diameter greater than the diameter of said seal surface, said edge being spaced from said plug and not sealing against said plug, in which said cap further comprises an outer skirt depending from said outer edge of said top, said plug being located inward of said outer skirt with an annular gap between said outer skirt and said plug, and a lower skirt depending from a lower skirt portion of said outer skirt and a line of weakness for separating said lower skirt from said outer skirt.

11. The combination of claim 10 in which said plug angularly depends from said top.

12. The combination of claim 10 in which said cap further comprises neck engaging means on said outer skirt, and in which said neck has a lower neck portion extending outwardly from a lower end of said sealing portion, said lower neck portion having cap engaging means located entirely below said sealing portion, said cap engaging means being positioned to engage said neck engaging means.

13. A container neck mold apparatus for use with a parison of pre-determined thickness comprising a blow pin having a first seal forming surface, a mold having a second seal forming surface, and means for moving one of said blow pin and said mold relative to the other of said blow pin and said mold between a first position and a second position, and wherein the distance between said first seal forming surface and said second seal forming surface after said one of said blow pin and said mold is moved from the first position to the second position being slightly less than said parison thickness whereby a neck molded by said apparatus comprises a smooth internal circumferential primary seal surface formed by said first seal forming surface and characterized by absence of parting line defects, wherein said blow pin further includes a first outward directed stretch, an first upward directed stretch joined to said first outward directed stretch, a first inward directed stretch joined to said first upward directed stretch, and first means for forming an edge of a container neck having a diameter greater than the diameter of said first seal forming surface, wherein said mold further includes a second outward directed stretch, an second upward directed stretch joined to said second outward directed stretch, a second inward directed stretch joined to said second upward directed stretch, and second means for forming an edge of said container neck having a diameter greater than the diameter of said second seal forming surface, said second forming means cooperating with said first forming means.

14. Apparatus according to claim 13 further comprising shearing means for shearing said parison above said seal surface.

15. Apparatus according to claim 14 in which said shearing means comprises first and second cooperating shearing means on said pin and said mold, respectively.

16. Apparatus according to claim 13 wherein said mold is a split mold, said apparatus further comprising means for moving said split mold between an open and a closed position.

17. In combination, a neck for a blow molded plastic container and a cap, said cap having a top, an outer skirt depending from said top, a projection proximal the juncture of an underside of said top and an inner surface of said outer skirt, and a plug substantially vertically depending from said top, said plug being located inward of said outer skirt with an annular gap between said outer skirt and said plug, and internal neck-engaging means on said outer skirt, said neck comprising a first portion having a sealing surface having a smooth, internal primary seal surface characterized by the absence of mold parting lines sealingly engaging said plug, said first portion and said seal surface extending substantially vertically upward to a substantially horizontal terminus, said inner projection biasing said sealing surface into tight engagement with said plug, said sealing surface and said first portion having a substantially constant inner diameter, a second portion extending downward below said first portion and at least one external cap engaging means on said second portion, said neck engaging means and said external cap engaging means comprising interengaging screw threads.

* * * * *